(12) United States Patent
Kishi et al.

(10) Patent No.: US 11,463,806 B2
(45) Date of Patent: Oct. 4, 2022

(54) NON-TRANSITORY COMPUTER-READABLE STORAGE MEDIUM FOR STORING SOUND SIGNAL CONVERSION PROGRAM, METHOD OF CONVERTING SOUND SIGNAL, AND SOUND SIGNAL CONVERSION DEVICE

(71) Applicant: FUJITSU LIMITED, Kawasaki (JP)

(72) Inventors: Yohei Kishi, Kawasaki (JP); Masanao Suzuki, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 92 days.

(21) Appl. No.: 17/062,122

(22) Filed: Oct. 2, 2020

(65) Prior Publication Data

US 2021/0152927 A1 May 20, 2021

(30) Foreign Application Priority Data

Nov. 18, 2019 (JP) .............................. JP2019-207622

(51) Int. Cl.
*H04R 1/32* (2006.01)
*G10L 17/00* (2013.01)
(Continued)

(52) U.S. Cl.
CPC .............. *H04R 1/326* (2013.01); *G10L 17/00* (2013.01); *H04R 5/027* (2013.01); *G10L 15/00* (2013.01);
(Continued)

(58) Field of Classification Search
CPC .......... H04R 1/326; H04R 5/027; H04R 1/38; H04R 3/00; H04R 3/005; H04R 25/405;
(Continued)

(56) References Cited

U.S. PATENT DOCUMENTS 4,206,324 A * 6/1980 Horikawa ............... H04R 5/027
381/26
7,020,290 B1 * 3/2006 Ribic ..................... H04R 3/005
381/313

(Continued)

FOREIGN PATENT DOCUMENTS

JP        2001-236092 A        8/2001
JP        2002171590 A *       6/2002
(Continued)

OTHER PUBLICATIONS

Variety of Life, The Mid Side Technique, Variety of Sound (Year: 2011).*

*Primary Examiner* — Matthew A Eason
*Assistant Examiner* — Kuassi A Ganmavo
(74) *Attorney, Agent, or Firm* — Fujitsu Patent Center

(57) ABSTRACT

A method includes: generating a first and second shift signal by using a phase of a sound signal regarding an M-channel or a S-channel, the sound signal of the M-channel and the sound signal of the S-channel being obtained by using a mid-side microphone, the sound signal of the S-channel including a positive channel and a negative channel, the first shift signal being configured to reduce a phase difference caused by a difference between a sound arrival distance to the M-channel and a sound arrival distance to the positive channel of the S-channel, the second shift signal being
(Continued)

configured to reduce a phase difference caused by a difference between the sound arrival distance to the M-channel and a sound arrival distance to the negative channel of the S-channel; and approximately converting the first or second shift signal into an L-channel signal and an R-channel signal of an XY-microphone.

15 Claims, 31 Drawing Sheets

(51) Int. Cl.

| | |
|---|---|
| *H04R 5/027* | (2006.01) |
| *H04R 1/38* | (2006.01) |
| *H04R 25/00* | (2006.01) |
| *G10L 25/51* | (2013.01) |
| *H04R 3/00* | (2006.01) |
| *G10L 15/00* | (2013.01) |
| *H04S 1/00* | (2006.01) |

(52) U.S. Cl.
CPC ............... *G10L 25/51* (2013.01); *H04R 1/38* (2013.01); *H04R 3/00* (2013.01); *H04R 3/005* (2013.01); *H04R 25/405* (2013.01); *H04R 25/407* (2013.01); *H04S 1/002* (2013.01)

(58) Field of Classification Search
CPC ....... H04R 25/407; G10L 17/00; G10L 15/00; G10L 25/51; G10L 15/28; H04S 1/002
See application file for complete search history.

(56) References Cited

U.S. PATENT DOCUMENTS

| | | | |
|---|---|---|---|
| 2001/0019516 A1 | 9/2001 | Wake et al. | |
| 2008/0310649 A1* | 12/2008 | Yamada | H04R 5/027 381/92 |
| 2010/0331048 A1* | 12/2010 | Xiang | H04S 5/00 381/1 |
| 2011/0301950 A1* | 12/2011 | Ouchi | G10L 15/28 704/E15.001 |
| 2012/0063613 A1* | 3/2012 | Sato | H04R 3/005 381/92 |
| 2012/0128174 A1* | 5/2012 | Tammi | H04S 1/002 381/98 |

FOREIGN PATENT DOCUMENTS

| | | | | |
|---|---|---|---|---|
| JP | 2007214913 A | * | 8/2007 | |
| JP | 2009-260708 A | | 11/2009 | |
| WO | WO-2006125870 A1 | * | 11/2006 | ............. H04R 3/005 |

\* cited by examiner

NON-TRANSITORY COMPUTER-READABLE STORAGE MEDIUM FOR STORING SOUND SIGNAL CONVERSION PROGRAM, METHOD OF CONVERTING SOUND SIGNAL, AND SOUND SIGNAL CONVERSION DEVICE

CROSS-REFERENCE TO RELATED APPLICATION

This application is based upon and claims the benefit of priority of the prior Japanese Patent Application No. 2019-207622, filed on Nov. 18, 2019, the entire contents of which are incorporated herein by reference.

FIELD

The embodiments discussed herein are related to a non-transitory computer-readable storage medium for storing a sound signal conversion program, a method of converting a sound signal, and a sound signal conversion device.

BACKGROUND

When operation a speech translation system is used in a medical field, medical personnel often fully use their hands for work, and accordingly, for example, it is difficult to, for example, operate buttons with their hands. Thus, a voice operation function is desired. In the voice operation function, it is desired, based on the voice, to identify whether medical personnel or a patient is speaking, automatically detect and extract speech part, and automatically perform speech translation on the speech part.

When a microphone having a plurality of channels is used for inputting voice, it is possible to identify which speaker is speaking. Examples of the microphone having a plurality of channels include a mid-side (MS) method microphone.

SUMMARY

According to an aspect of the embodiments, provided is a method of converting a sound signal, the method being implemented by a computer. In an example, the method includes: generating a first shift signal and a second shift signal by using at least any one of a phase of a sound signal of an M-channel and a phase of a sound signal of a S-channel, the sound signal of the M-channel and the sound signal of the S-channel being obtained by using a mid-side microphone, the sound signal of the S-channel including a sound signal of a positive channel and a sound signal of a negative channel, the first shift signal being a signal configured to reduce a phase difference caused by a difference between a sound arrival distance to the M-channel of the mid-side microphone and a sound arrival distance to the positive channel of the S-channel of the mid-side microphone, the second shift signal being a signal configured to reduce a phase difference caused by a difference between the sound arrival distance to the M-channel and a sound arrival distance to the negative channel of the S-channel; and approximately converting at least any one of the first shift signal and the second shift signal into an L-channel signal and an R-channel signal of an XY-microphone.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

However, when the MS microphone is used, appropriate determination of a sound source direction is not necessarily performed due to the elevation angle between the MS microphone and the sound source.

In an aspect of the embodiments, provided is a solution to allow improvement of accuracy in determining a sound source direction of a sound collected by an MS microphone.

First Embodiment

An example of a first embodiment will be described in detail below with reference to the drawings.

Figure 1:
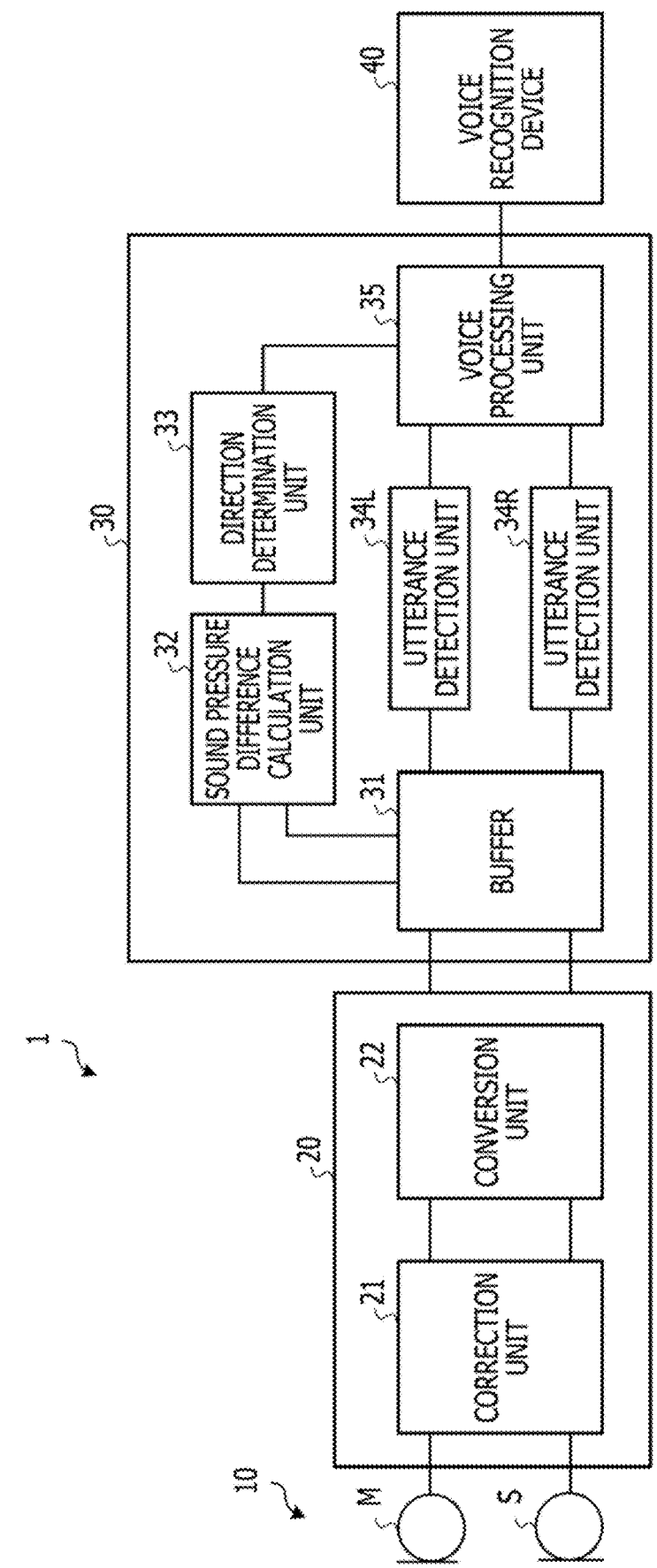
FIG. 1 is an example of a hardware configuration view of a voice recognition system according to a first embodiment.

A voice recognition system 1 exemplified in FIG. 1 includes a mid-side microphone 10 (hereinafter referred to as "MS mic". The microphone is referred to as "mic".) that includes an M channel and an S channel. The voice recognition system 1 also includes a sound signal conversion device 20, a voice processing device 30, and a voice recognition device 40.

Figure 2:
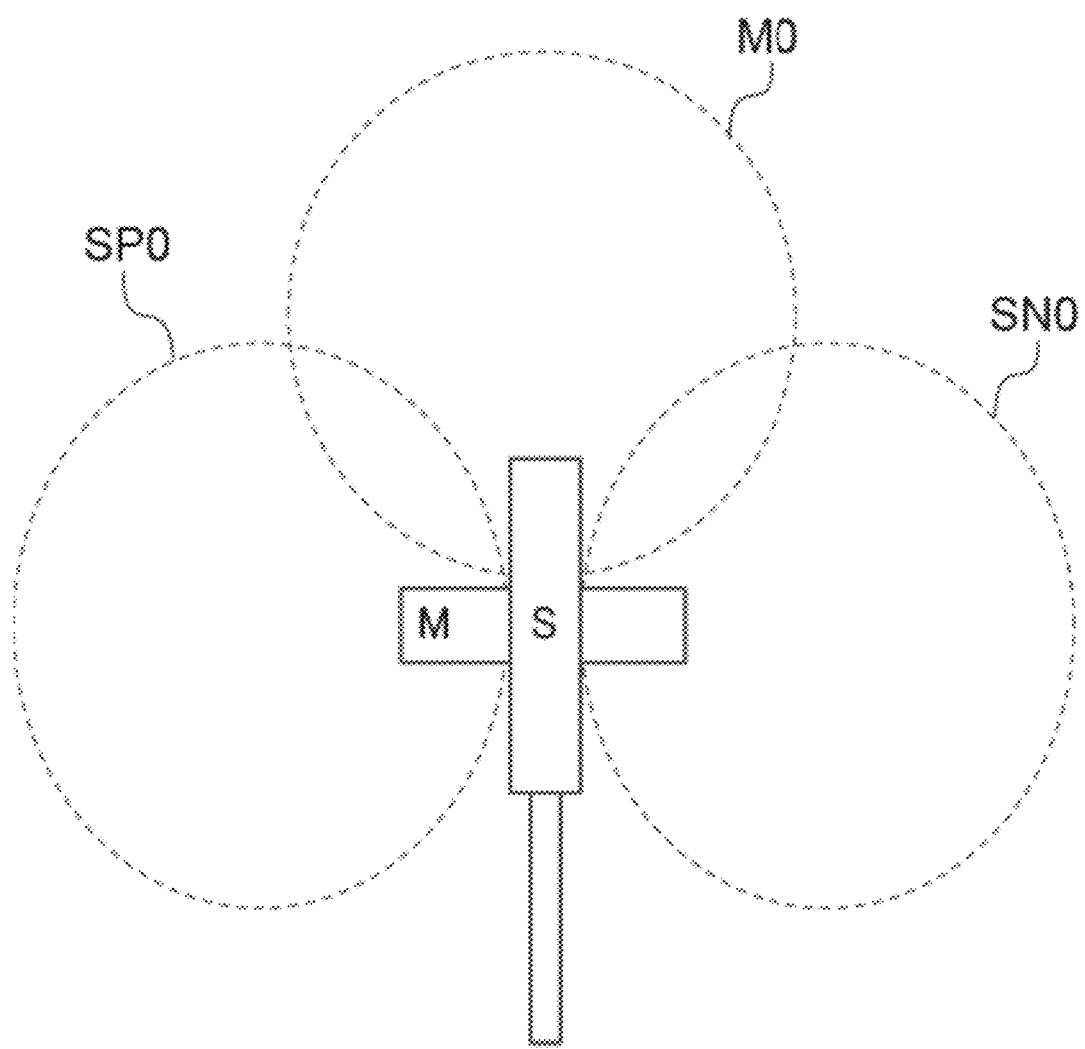
FIG. 2 is an example of a conceptual view for explaining the function of a mid-side (MS) method microphone.

As exemplified in FIG. 2, the MS mic includes an M-channel mic that is a unidirectional mic having a directivity in a front direction MO and an S-channel mic that is a bidirectional mic having directivities in left-right directions SPO and SNO. The MS mic collects sounds in the front direction and the left-right directions. The bidirectional mic collects sound from two directions, left and right directions. A sound signal from one direction of the two directions is in positive phase and a sound signal from the other direction of the two directions is in opposite phase. Herein, a channel that collects a sound signal in positive phase is referred to as a positive channel, and a channel that collects a sound signal in opposite phase is referred to as a negative channel.

The sound signal conversion device 20 includes a correction unit 21 and a conversion unit 22 exemplifying a generation unit and a selection unit. The correction unit 21 corrects the phase of a sound signal of a sound collected in one of the M channel and the S channel such that the phase of the sound signal of the sound collected in the one of the M channel and the S channel matches with the phase of the sound signal of the sound collected in the other of the M channel and the S channel. The conversion unit 22 uses the sound signals corrected by the correction unit 21 to approximately convert the sound signals of the sounds collected in the M channel and the S channel into sound signals of sounds collected in an L channel and an R channel. The L channel is a channel for collecting sound in front of an XY microphone on the left side, and the R channel is a channel for collecting sound in front of the XY microphone on the right side.

The voice processing device 30 includes a buffer 31, a sound pressure difference calculation unit 32, a direction determination unit 33, utterance detection units 34L, 34R, and a voice processing unit 35. The buffer 31 temporarily stores the sound signals of the L channel and the R channel received from the sound signal conversion device 20 and transmits the sound signals to the sound pressure difference calculation unit 32 and the utterance detection units 34L, 34R.

The sound pressure difference calculation unit 32 calculates a sound pressure difference between the sound signal of the L channel and the sound signal of the R channel. The direction determination unit 33 determines a direction in which a sound source is present based on the sound pressure difference received from the sound pressure difference calculation unit 32. The utterance detection unit 34L detects an utterance section in the sound signal of the L channel, and the utterance detection unit 34R detects an utterance section in the sound signal of the R channel. The voice processing unit 35 extracts a voice to be recognized by using the sound source determined by the direction determination unit 33, for example, a direction in which a speaker is present and the utterance section detected by the utterance detection unit 34L or 34R. For example, when the speaker present direction is in front of the MS mic 10 on the right side, only the sound signal of the R channel is transmitted to the voice recognition device 40.

The voice recognition device 40 recognizes a voice by using the voice and information received from the voice processing device 30. For example, the voice is recognized as a first language when the speaker present direction is in front of the MS mic 10 right side, and the voice is recognized as a second language when the speaker present direction is in front of the MS mic 10 on the left side. The first language may be, for example, English, and the second language may be, for example, Japanese.

Figure 3:
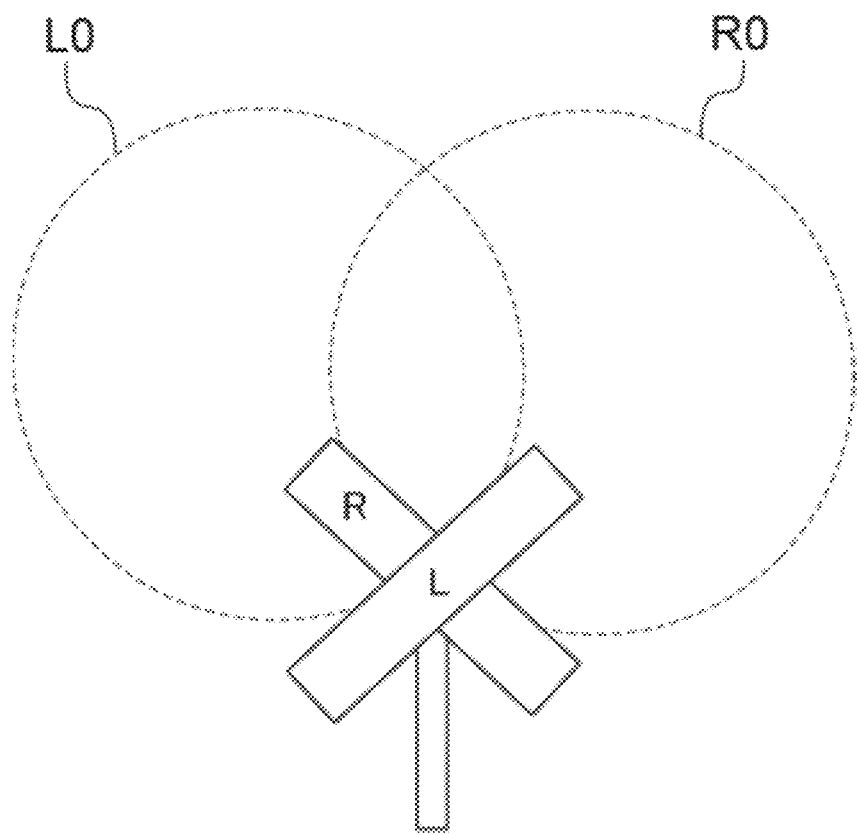
FIG. 3 is an example of a conceptual view for explaining the function of an XY microphone.

Next, operation of the sound signal conversion device 20 is described. As exemplified in FIG. 3, the XY mic includes an L-channel mic that is a unidirectional mic having a directivity in a left direction LO and an R-channel mic that is a unidirectional mic having a directivity in a right direction RO. The XY mic collects a sound in the left direction and a sound in the right direction.

A sound signal $V_M$ of the sound collected by the M channel of the MS mic and a sound signal $V_S$ of the sound collected by the S channel of the MS mic are able to be approximately converted into a sound signal $V_L$ of the sound collected by the L channel and a sound signal $V_R$ of the sound collected by the R channel, respectively, by using Expressions (1). In the conversion, spreading sensation of the sound is adjusted by adjusting a coefficient k of the sound signal $V_S$ of the sound collected by the S channel. As the coefficient k increases, the spreading sensation is produced.

$$V_L = (V_M + kV_S)/2$$

$$V_R = (V_M - kV_S)/2 \quad (1).$$

A spectrum $F_M$ of the sound signal of the M channel and a spectrum $F_S$ of the sound signal of the S channel are able to be represented by Expressions (2).

$$F_M = V_{Mre} + iV_{Mim}$$

$$F_S = V_{Sre} + iV_{Sim} \quad (2).$$

$V_{MRe}$ is a real number representing the real part of the sound signal $V_M$, $V_{Mim}$ is a real number representing the imaginary part of the sound signal $V_M$, $V_{Sre}$ is a real number representing the real part of the sound signal $V_S$, and $V_{Sim}$ is a real number representing the imaginary part of the sound signal $V_S$.

A sound pressure of the L channel $|V_L|$ and a sound pressure of the R channel $|V_R|$ are able to be calculated by using Expression (3).

$$|V_L| = 10 \log_{10}\{(V_{Mre} + kV_{Sre})^2 + (V_{Mim} + kV_{Sim})^2\} = 10 \log_{10}\{(V_{Mre}^2 + V_{Mim}^2) + k^2(V_{Sre}^2 + V_{Sim}^2) + 2k(V_{Mre}V_{Sre} + V_{Mim}V_{Sim})\} |V_R| = 10 \log_{10}\{(V_{Mre} - kV_{Sre})^2 + (V_{Mim} - kV_{Sim})^2\} = 10 \log_{10}\{(V_{Mre}^2 + V_{Mim}^2) + k^2(V_{Sre}^2 + V_{Sim}^2) + 2k(V_{Mre}(-V_{Sre}) + V_{Mim}(-V_{Sim}))\} \quad (3).$$

For example, the sound pressure of the L channel is approximated by the total of the sound pressure of the M channel $V_{Mre}^2 + V_{Mim}^2$, the sound pressure of the S channel $V_{Sre}^2 + V_{Sim}^2$ and an inner product of the sound of the M channel and the sound of an S positive channel $V_{Mre}V_{Sre} + V_{mim}V_{Sim}$. In contrast, the sound pressure of the R channel is approximated by the total of the sound pressure of the M channel $V_{Mre}^2 + V_{Mim}^2$, the sound pressure of the S channel $V_{Sre}^2 + V_{Sim}^2$, and an inner product of the sound of the M channel and the sound of an S negative channel $V_{Mre}(-V_{Sre}) + V_{mim}(-V_{Sim})$.

Accordingly, as the inner product of the sound signal of the M channel and the sound signal of the S positive channel $V_{Mre}V_{Sre} + V_{Mim}V_{Sim}$ increases, for example, when the sound signal of the M channel and the sound signal of the S positive channel are similar to each other, the sound pressure of the L channel increases. In contrast, as the inner product of the sound signal of the M channel and the sound signal of the S negative channel $V_{Mre}(-V_{Sre}) + V_{Mim}(-V_{Sim})$ increases, for example, when the sound signal of the M channel and the sound signal of the S negative channel are similar to each other, the sound pressure of the R channel increases.

Figure 4:
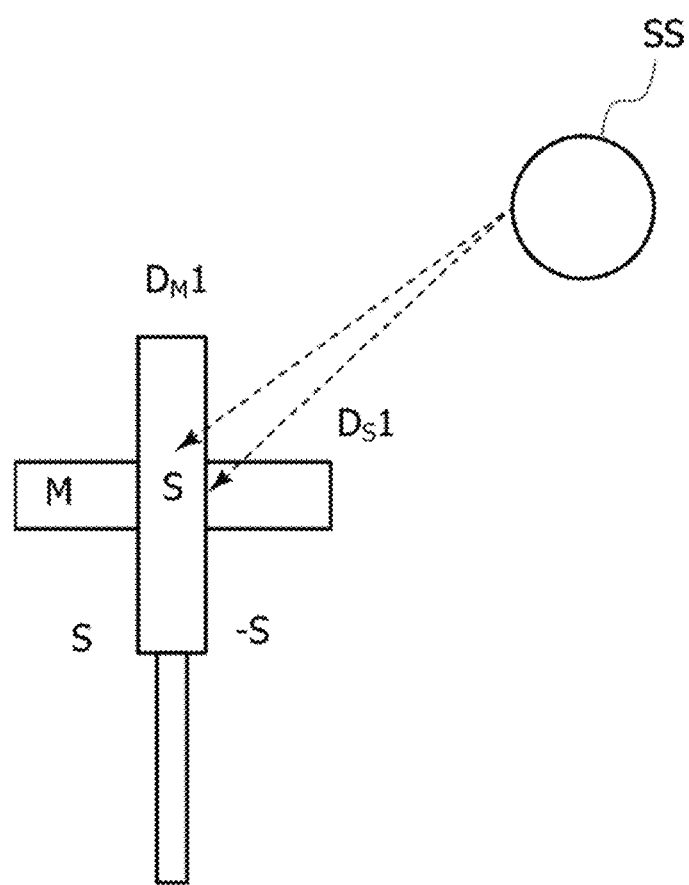
FIG. 4 is an example of a conceptual view for explaining a difference in phase between sound signals of an M-channel microphone and an S-channel microphone.

As exemplified in FIG. 4, when a sound source SS is present in front of the MS mic on the right side, similar sounds are collected in the M channel and the S negative channel (also referred to as "–S channel" hereinafter). However, since the distance between the sound source SS and the MS mic is $D_{M1}$ in the M channel and $D_{S1}$ in the –S channel, the sound signal of the M channel and the sound signal of the –S channel are in different phases. For example, the phase of the sound signal of the M channel is delayed by a distance $|D_{M1} - D_{S1}|$.

Figure 5:
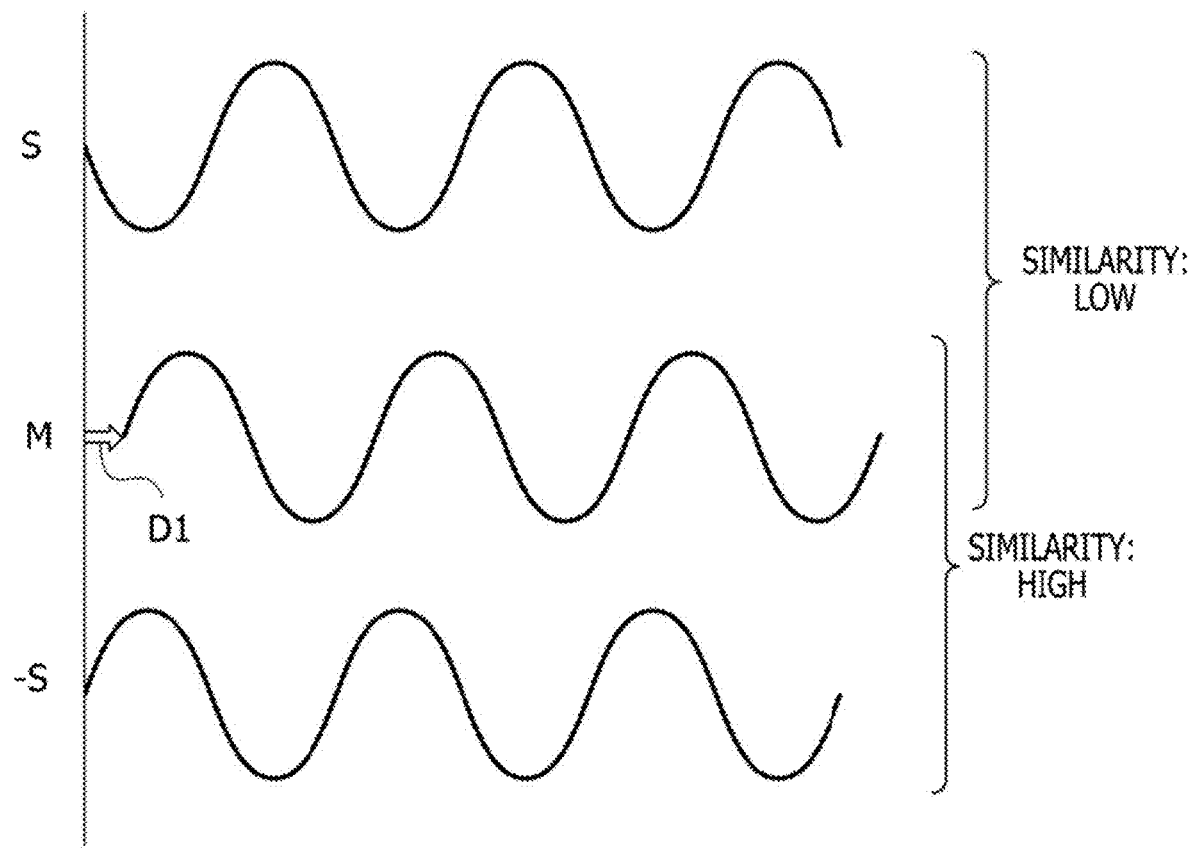
FIG. 5 is an example of a conceptual view for explaining a phase difference between sound signals of an M-channel microphone and an S-channel microphone.

However, the distance $|D_{M1} - D_{S1}|$ is small. Thus, as exemplified in FIG. 5, a delay amount D1 is small, and accordingly, a similarity between the sound signal of the M channel and the sound signal of the –S channel is higher than a similarity between the sound signal of the M channel and the sound signal of the S channel which is the inverted sound signal of the sound signal of the –S channel. Thus, the sound pressure of the R channel calculated from the sound signal of the M channel and the sound signal of the –S channel is high and the sound pressure of the L channel calculated from the sound signal of the M channel and the sound signal of the S channel is low, and accordingly, it is determined that the sound source SS is present in front of the MS mic on the right side. For ease of understanding of the operation, the sound signals are represented by sine waves in FIG. 5.

Figure 6:
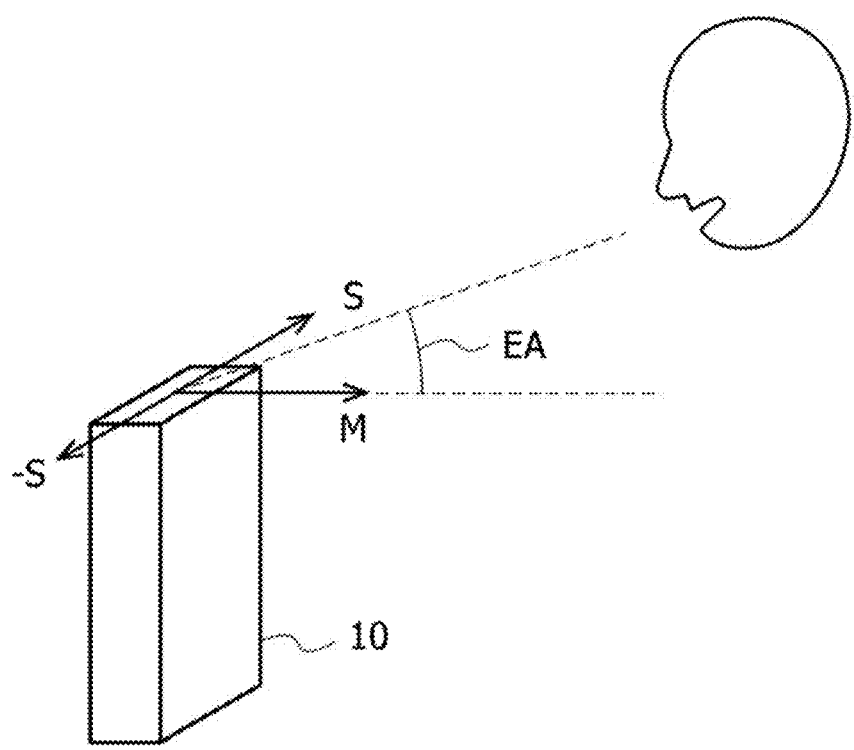
FIG. 6 is an example of a conceptual view for exemplifying an elevation angle from a sound source to the MS microphone.

When the MS mic is used, as an elevation angle EA exemplified in FIG. 6 increases, accuracy of calculation of the difference in sound pressure reduces, and accordingly, a difficulty in determining the sound source present direction increases. The elevation angle is an angle formed between a horizontal plane including the MS mic and a straight line passing through the MS mic and the sound source. When the sound source is a user, the elevation angle varies depending on the height of the user and the distance between the user and the MS mic.

Figure 7:
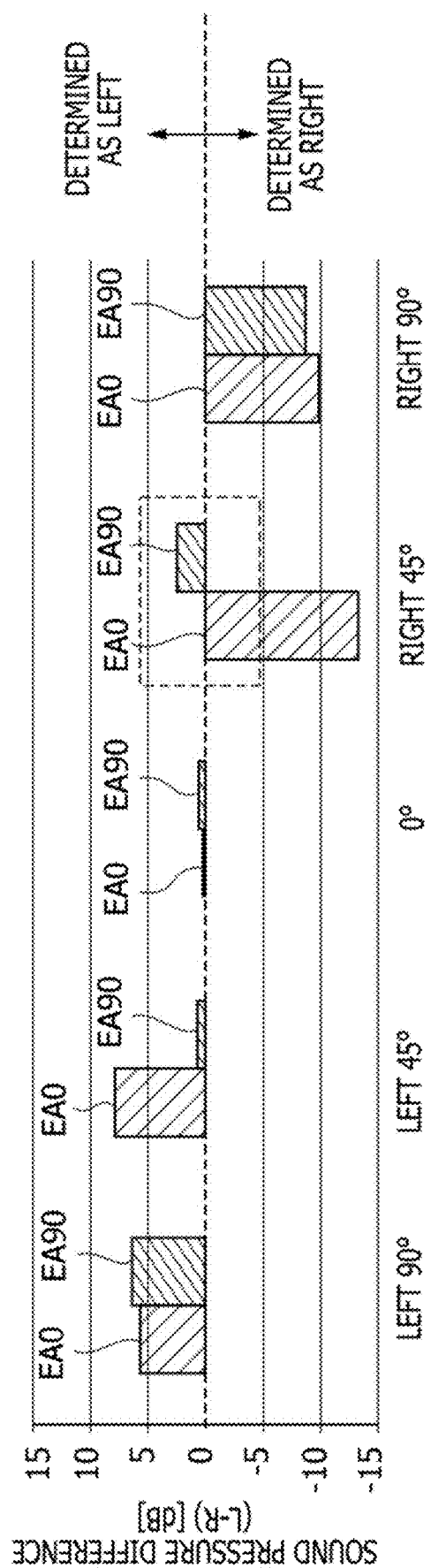
FIG. 7 is an example of a conceptual view exemplifying the relationship between a determined sound direction and the elevation angle from the sound source to the MS microphone.

FIG. 7 illustrates results of measuring the sound pressure difference by generating the same sound from the sound source when the position of the sound source is set to 90° and 45° in front of the MS mic on the left side, in front of the MS mic, for example, 0°, and 45° and 90° in front of the MS mic on the right side. In addition, at each position, the elevation angle of the position of the sound source is set to 0° (EA0) and 9° (EA90). When the sound source is present at the position of 90° in front of the MS mic on the left side, in front of the MS mic, and 90° in front of the MS mic on the right side, the position of the sound source is appropriately determined regardless of whether the elevation angle is 0° (EA0) or 90° (EA90).

When sound sources is present at the position of 45° in front of the MS mic on the left side or at the position of 45° in front of the MS mic on the right side, the position of the sound source is appropriately determined as long as the elevation angle is 0° (EA0). However, when the sound source is present at the position of 45° in front of the MS mic on the left side and at the position of 45° in front of the MS mic on the right side, the direction of the sound source is not appropriately determined in the case where the elevation angle is 90° (EA90).

Figure 8:
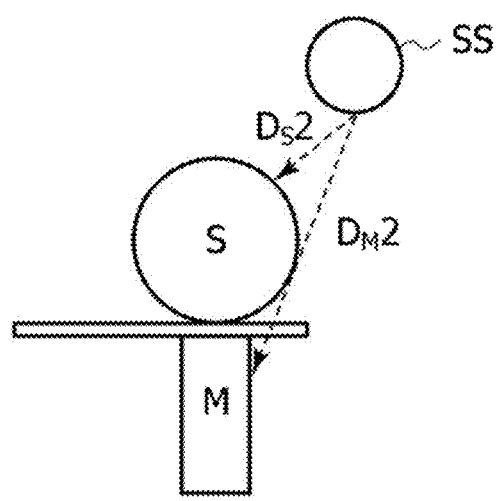
FIG. 8 is an example of a conceptual view for explaining the relationship between the position of the sound source relative to the MS microphone and the phase difference between the sound signals of the M-channel microphone and the S-channel microphone.

As exemplified in FIG. 8, when the M-channel mic is disposed over the S-channel mic and the elevation angle is large, the phase difference of the sound signal corresponding to the distance $|D_{M2} - D_{S2}|$ is also generated due to the elevation angle. When the M-channel mic and the S-channel mic are arranged on the left and right sides, a similar problem occurs due to the horizontal angle.

Figure 9:
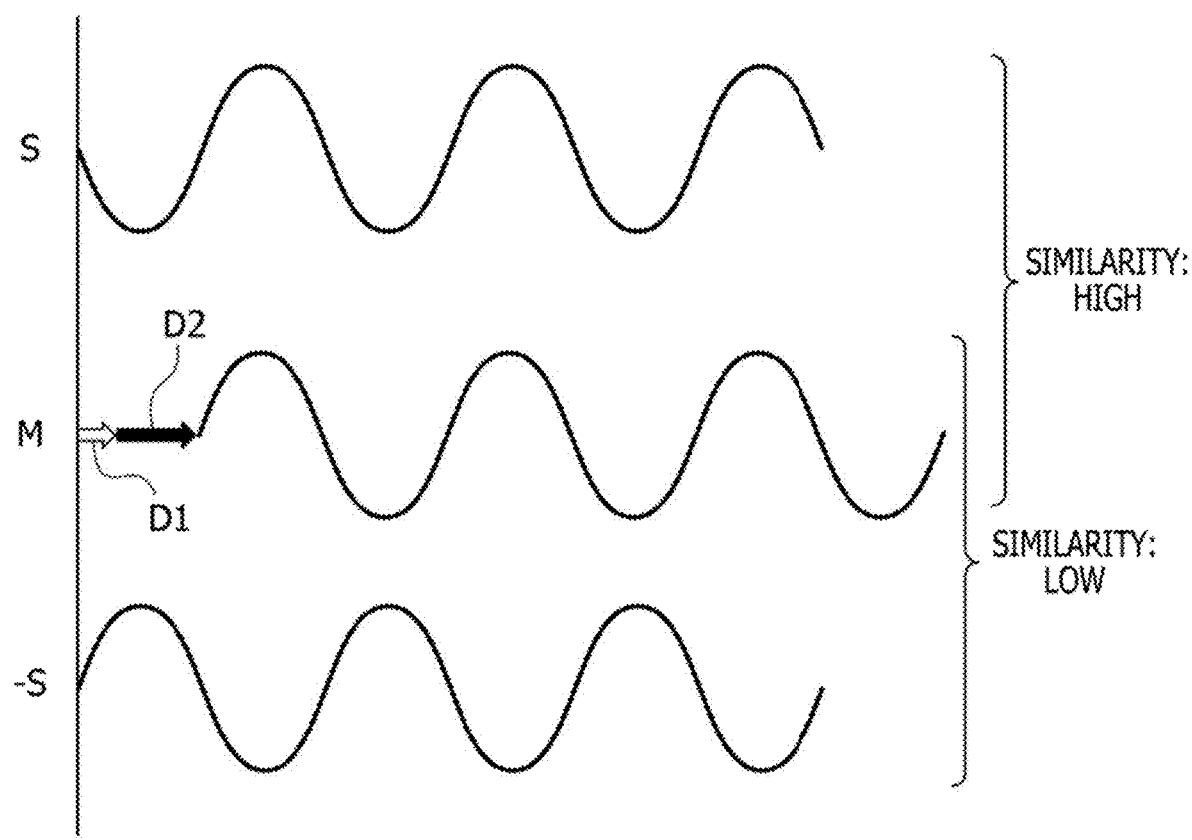
FIG. 9 is an example of a conceptual view for explaining the relationship between the elevation angle and the horizontal angle from the sound source to the MS microphone and the phase difference between the sound signals of the M-channel microphone and the S-channel microphone.

As exemplified in FIG. 9, when the sum of the phase delay D1 due to the horizontal angle and the phase delay D2 due to the elevation angle becomes close to a half the wavelength of the sound signal from the sound source, the similarity between the sound signal of the M channel and the sound signal of the S channel which is the inverted signal of the −S channel increases. As a result, the sound pressure of the L channel increases, and it is mistakenly determined that the sound source is present on the left side of the MS mic. Meanwhile, the similarity between the sound signal of the −S channel and the sound signal of the M channel reduces due to the delay of the sound signal of the M channel, and the sound pressure of the R channel reduces.

Figure 10:
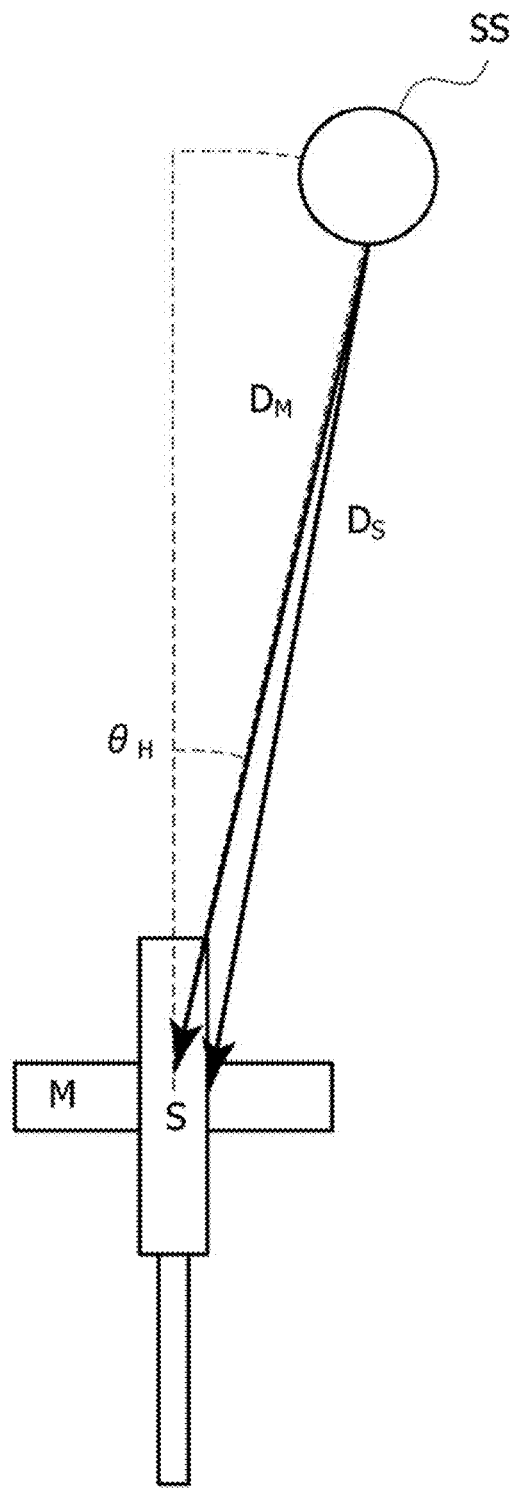
FIG. 10 is an example of a conceptual view for explaining the relationship between the horizontal angle from the sound source to the MS microphone and the phase difference between the sound signals of the M-channel microphone and the S-channel microphone.
Figure 11:
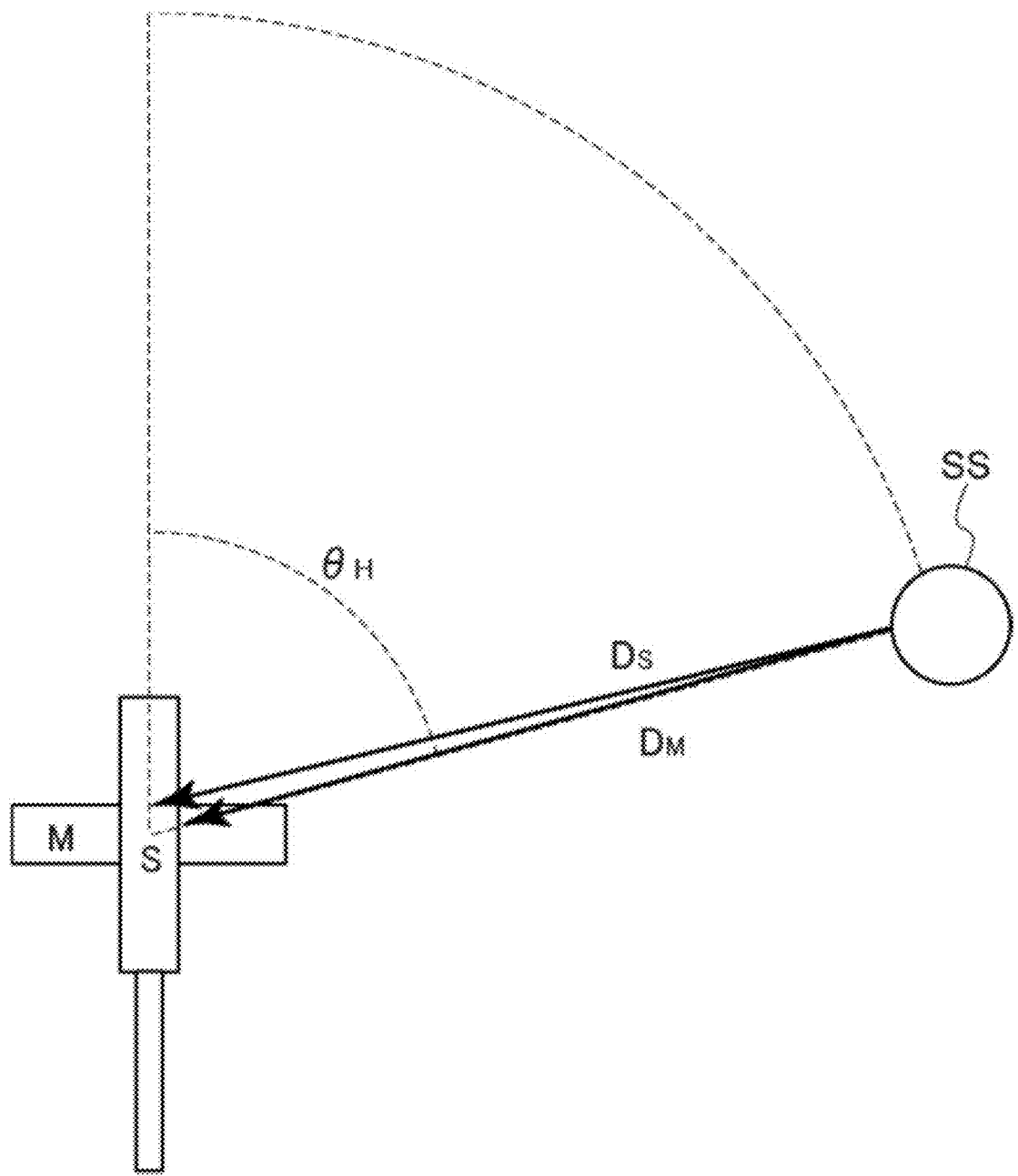
FIG. 11 is an example of a conceptual view for explaining the relationship between the horizontal angle from the sound source to the MS microphone and the phase difference between the sound signals of the M-channel microphone and the S-channel microphone.

As exemplified in FIGS. 10 and 11, when seen from above, a center position of the M-channel mic and a center position of the S-channel mic are close to each other. Accordingly, regardless of the magnitude of the left and right deviation, for example, the size of a horizontal angle $\theta_H$, the difference $|D_M-D_S|$ between the distance $D_M$ between the sound source SS and the M-channel mic and the distance $D_S$ between the sound source SS and the S-channel mic is small.

Figure 12:
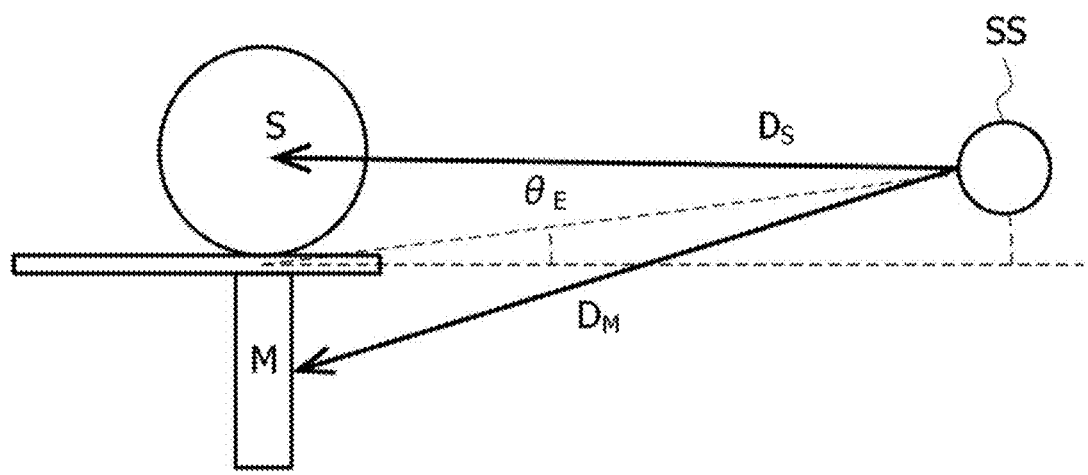
FIG. 12 is an example of a conceptual view for explaining the relationship between the elevation angle from the sound source to the MS microphone and the phase difference between the sound signals of the M-channel microphone and the S-channel microphone.
Figure 13:
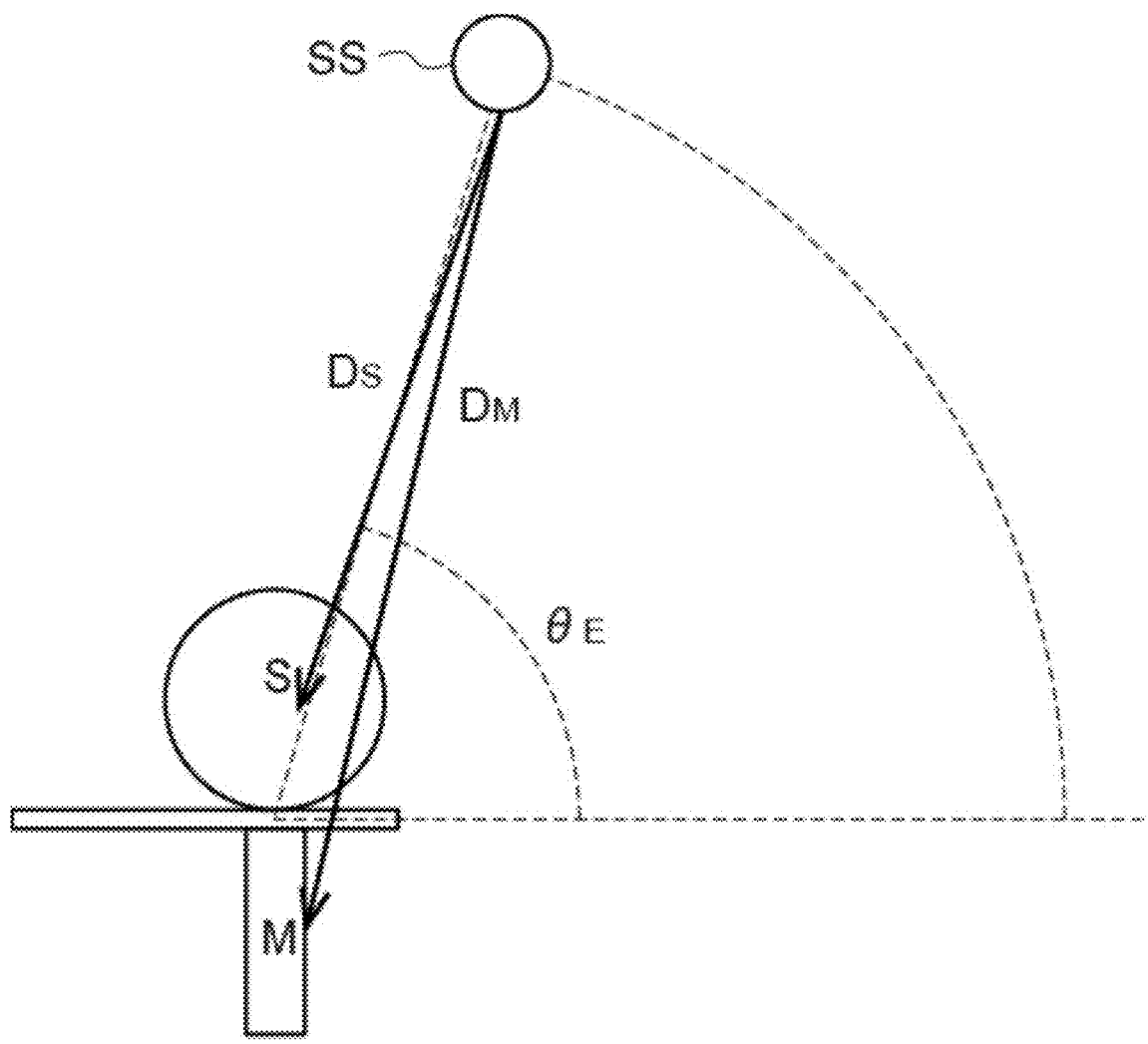
FIG. 13 is an example of a conceptual view for explaining the relationship between the elevation angle from the sound source to the MS microphone and the phase difference between the sound signals of the M-channel microphone and the S-channel microphone.

In contrast, as exemplified in FIGS. 12 and 13, when seen from side, the center position of the M-channel mic and the center position of the S-channel mic are farther from each other than when seen from above. Accordingly, the difference $|D_M-D_S|$ between the distance $D_M$ between the sound source SS and the M-channel mic and the distance $D_S$ between the sound source SS and the S-channel mic is large. The difference $|D_M-D_S|$ increases as the elevation angle $\theta_E$ increases. Thus, usually, use of the MS mic with a large elevation angle is not recommended.

Figure 14:
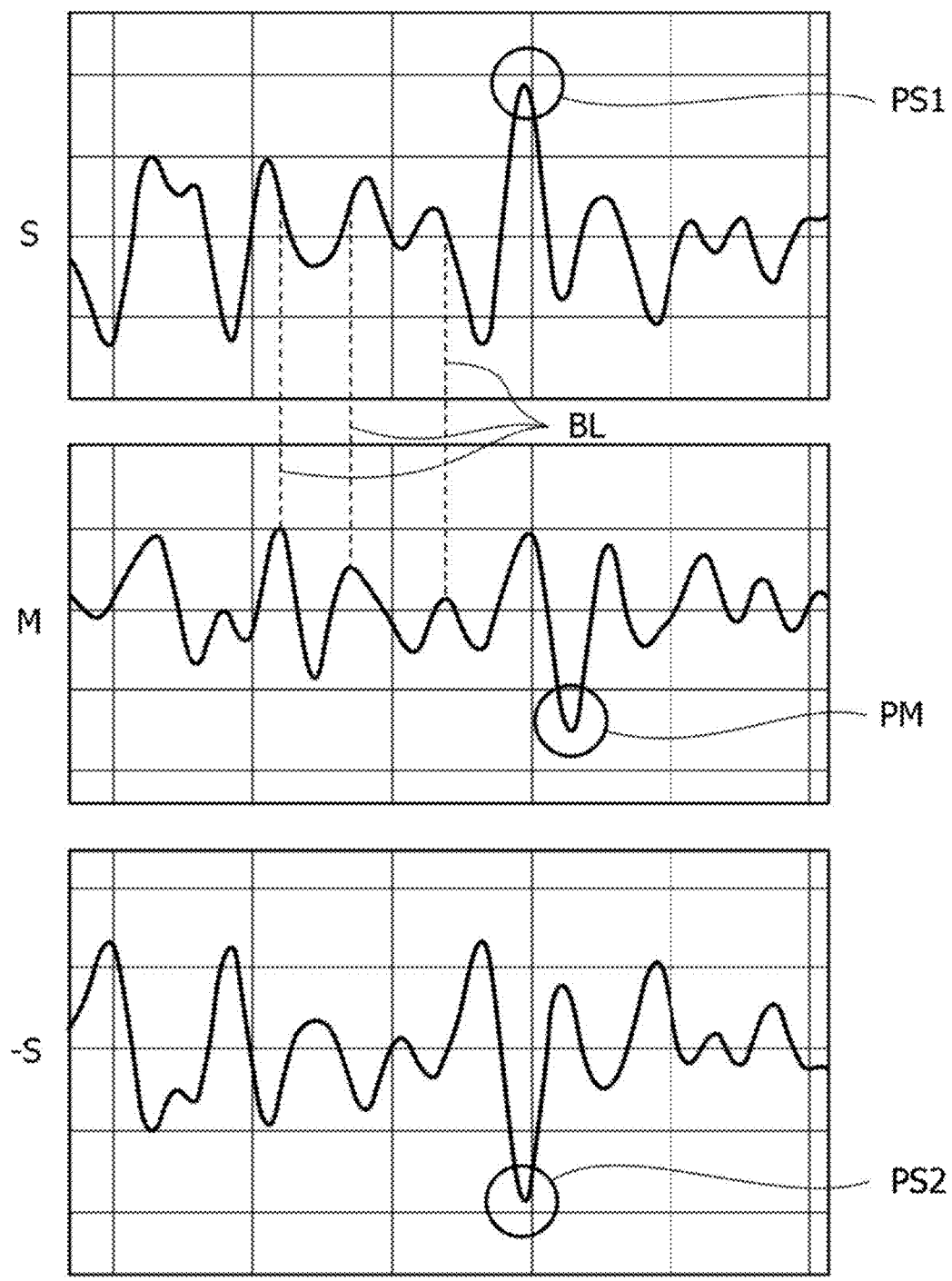
FIG. 14 is an example of a conceptual view for explaining similarity between the sound signal of the M-channel microphone and the sound signals of the S channel and the –S channel.

For example, in an example illustrated in FIG. 14, the sound source is present in front of the MS mic on the right side, and the sound signal of the M channel is similar to the sound signal of the −S channel. For example, an extreme PM of the M channel corresponds to an extreme PS2 of the −S channel, and an extreme PS1 of the S channel is an inverted value of the extreme PS2. However, since the sound signal of the M channel is delayed, the sound pressure of the R channel approximated from the sound signal of the M channel and the sound signal of the −S channel reduces. In contrast, as indicated by broken lines BL, when only relative maxima are compared, the sound signal of the M channel and the sound signal of the S channel are similar to each other in appearance, and the sound pressure of the L channel approximated from the sound signal of the M channel and the sound signal of the S channel increases.

Figure 15:
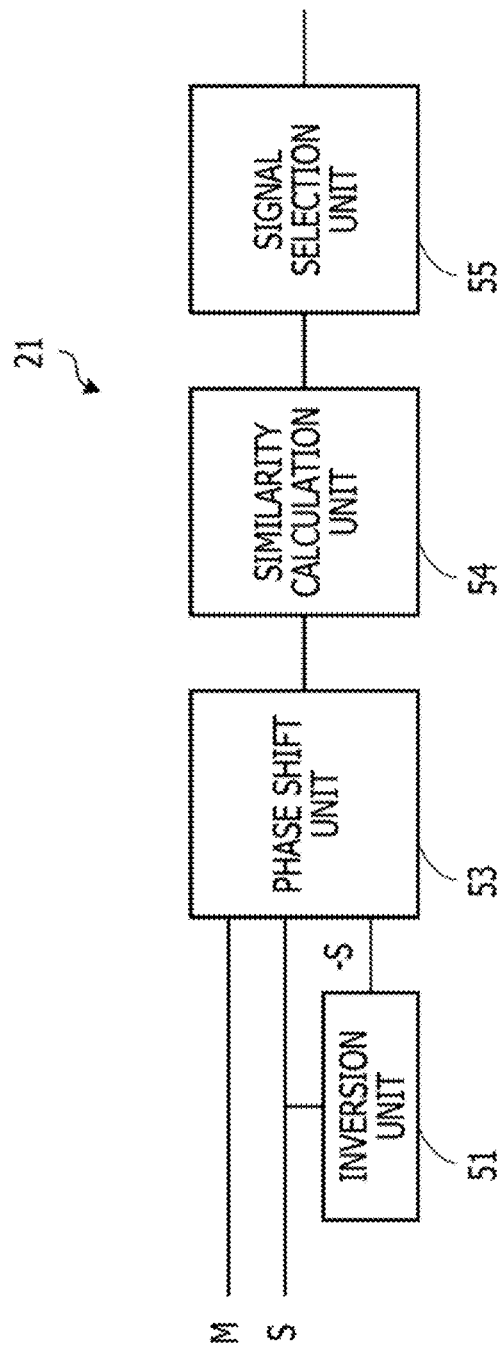
FIG. 15 is an example of a hardware configuration view of a correction unit of a sound signal conversion device according to the present embodiment.

As exemplified in FIG. 15, the correction unit 21 includes an inversion unit 51, a phase shift unit 53, a similarity calculation unit 54, and a signal selection unit 55. According to the present embodiment, the phase of the sound signal of the M channel is corrected with reference to the phases of the sound signal of the S channel and the sound signal of the −S channel so as to increase the sound pressure of an appropriate channel. The inversion unit 51 Inverts the sound signal of the S channel to generate the sound signal of the −S channel.

Figure 16:
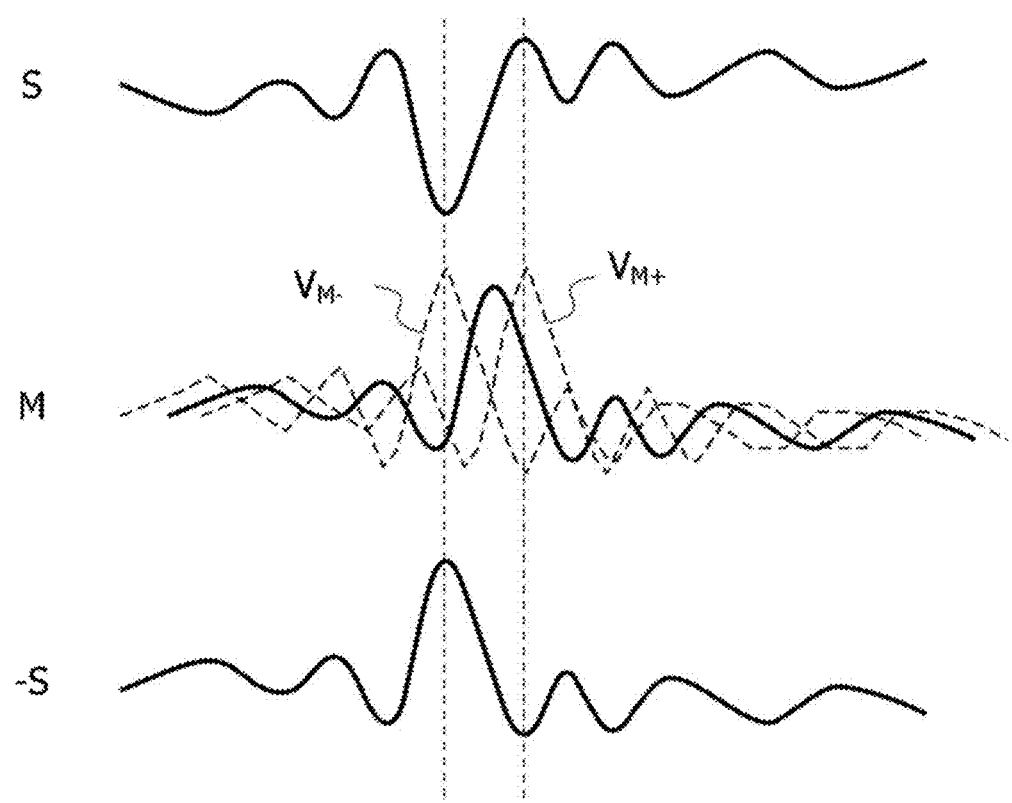
FIG. 16 is an example of a conceptual view for explaining correction of the phase of the sound signal of the M-channel microphone.

The phase shift unit 53 shifts the phase of the sound signal of the M channel first predetermined amount-by-first predetermined amount. The similarity calculation unit 54 calculates similarity between the shifted sound signal of the M channel and the sound signals of the S channel and −S channel. The signal selection unit 55 selects a correction shift amount that maximizes the similarity and selects from among the S channel and the −S channel that maximizes the similarity. FIG. 16 exemplifies a shift signal $V_{M+}$ obtained by shifting the phase of the sound signal of the M channel in an advancing direction and a shift signal $V_{M-}$ obtained by shifting the phase of the sound signal of the M channel in the delay direction.

Expression (4) represents the phase of the sound signal $V_M$ which herein is a shift signal $V_{MH}$ obtained by shifting a sample in the sound signal $V_M$ being a digital signal. $V_{MH}(t, p)$ is a signal obtained by shifting the phase of the signal $V_M$ of a sample t by p samples, where t represents an ordinal number of the sample, and p represents the number of samples for the shifting. A range of the number of samples for the shifting may be, for example, −nn≤p≤nn, where nn may be, for example, 7.

$$V_{MH}(t,p)=V_M(t+p) \qquad (4).$$

When an interactive voice is recognized, a small terminal such as a tablet is often used to obtain the voice. Since an MS mic used for a tablet is small, the distance between the M-channel mic and the S-channel mic is generally smaller than 5 cm. The difference in sound arrival time between the mics is calculated by, for example, Expression (5).

Difference in sound arrival time between mics=Maximum distance between mics/Speed of sound (5).

When the distance between the mics is assumed to be 5 cm, the phase difference between the sound signals is 7.25 samples as calculated by, for example, Expression (6).

$$\text{Difference in arrival time between microphones} = 5 \text{ cm}/331 \text{ m/s} \qquad (6).$$
$$= 0.05 \text{ m}/331 \text{ m/s}$$
$$= 1.51 \times 10^{-4} \text{ s}$$

When a sampling frequency is 48 kHz, the number of phase difference samples is calculated by, for example, Expression (7).

Phase difference[samples]=48000×1.51×10⁻⁴≈7.25 [samples] (7).

The similarity calculation unit 54 calculates, as the similarity, for example, a cross-correlation coefficient between two signals that are the sound signal $V_{MH}$ and the sound signal $V_S$ and a cross-correlation coefficient between two signals that are the sound signal $V_{MH}$ and a sound signal $V_{-S}$. The cross-correlation coefficient between two signals that are the sound signal $V_{MH}$ and the sound signal $V_S$ are able to be calculated by using, for example, Expression (8). The cross-correlation coefficient indicates the degree of similarity between two signals. As the cross-correlation coefficient becomes close to 1, the similarity between two signals increases, and the cross-correlation coefficient becomes close to 0, the similarity between two signals reduces.

$$C_+(p, t) = \frac{\sum_{n=0}^{N-1}[\{V_{MH}(t-n, p) - \overline{V_{MH}}\}\{V_S(t-n) - \overline{V_S}\}]}{|sd(V_{MH})||sd(V_S)|} \qquad (8)$$

$C_+$ is a cross-correlation coefficient between the sound signal $V_{MH}$ and the sound signal $V_S$, $C_+(p, t)$ is a cross-correlation coefficient when the sample number for shifting is p and a sampling time point is t. $V_{MH}$ is the phase shifted sound signal $V_M$. N is a length of a calculation range of the cross-correlation, $V_{MH}$ bar is an average of the signal $V_{MH}$ (t−n, p) at n=0 to N−1, $V_S$ bar is an average of the signal $V_S$(t−n) at n=0 to N−1, sd($V_{MH}$) is the standard deviation of the signal $V_{MH}$(t−n, p) at n=0 to N−1, and sd($V_S$) is the standard deviation of the signal $V_S$(t−n) at n=0 to N−1.

N may be, for example, the number of samples corresponding to 0.1 second. C(p, t)=−C$_+$(p t). C$_-$(p, t) is a cross-correlation coefficient between the sound signal $V_{-S}$ and the sound signal $V_{MH}$ at the sampling time point t where the sample number for shifting is p.

The signal selection unit 55 selects the maximum from among the calculated cross-correlation coefficients C$_+$(p, t) and C$_-$(p, t), selects either the S channel or the −S channel as a selection signal in accordance with the maximum of the cross-correlation coefficients, and selects the number of samples for shifting the sound signal of the M channel. As exemplified by Expressions (9), the sound signal $V_{MH}$ of the M channel shifted by pp samples and the sound signal of the selected S channel or −S channel are approximately converted into the sound signal of the L channel and the sound signal of the R channel, respectively.

$$V_L = (V_{MH} + kV_S)/2$$

$$V_R = (V_{MH} - kV_S)/2 \quad (9).$$

Here, adjustment of the spreading sensation of the sound may be omitted, and accordingly, k may be 1.0 so that the difference between the left and right is most noticeable.

Figure 17:
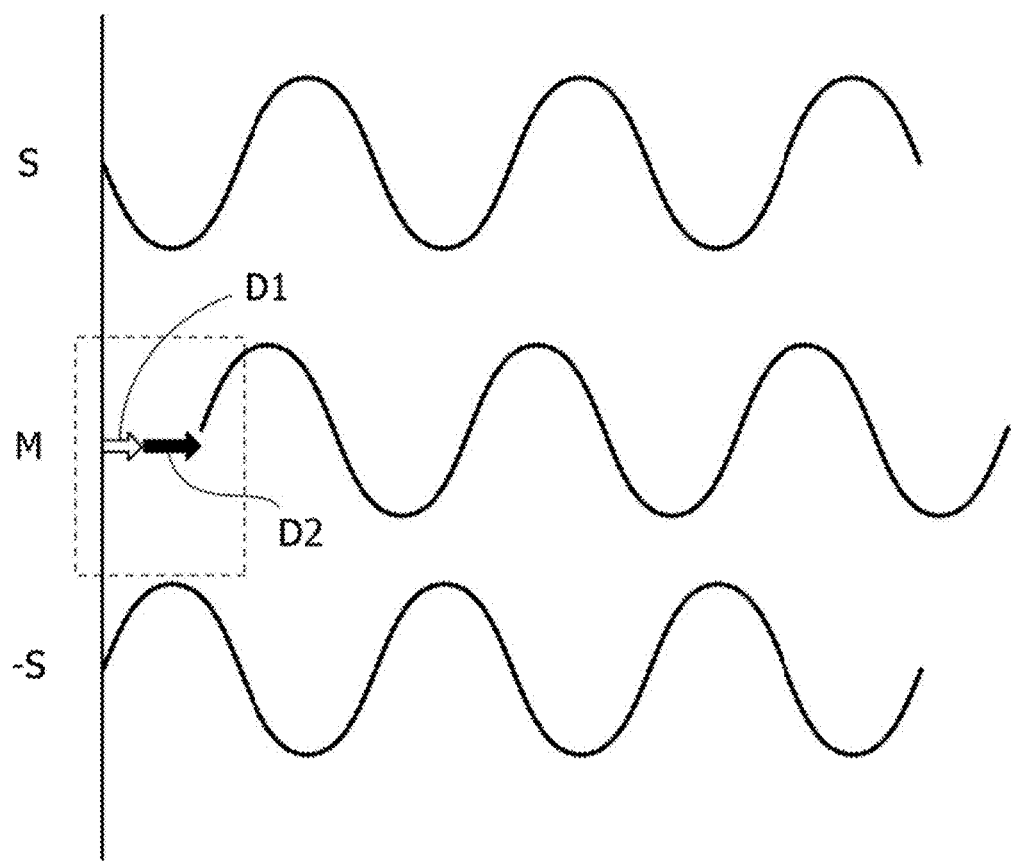
FIG. 17 is an example of a conceptual view for explaining delay of the phase of the sound signal of the M-channel microphone caused by the elevation angle and the horizontal angle from the sound source to the MS microphone.
Figure 18:
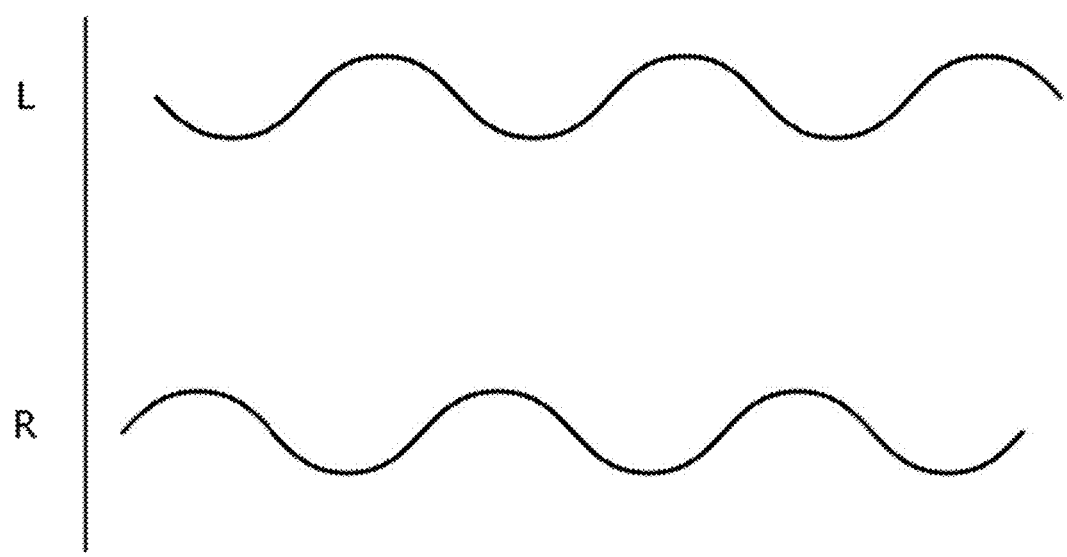
FIG. 18 is an example of a conceptual view illustrating sound signals of an L channel and an R channel having been approximately converted by using the sound signals of the M channel and the S channel.
Figure 19:
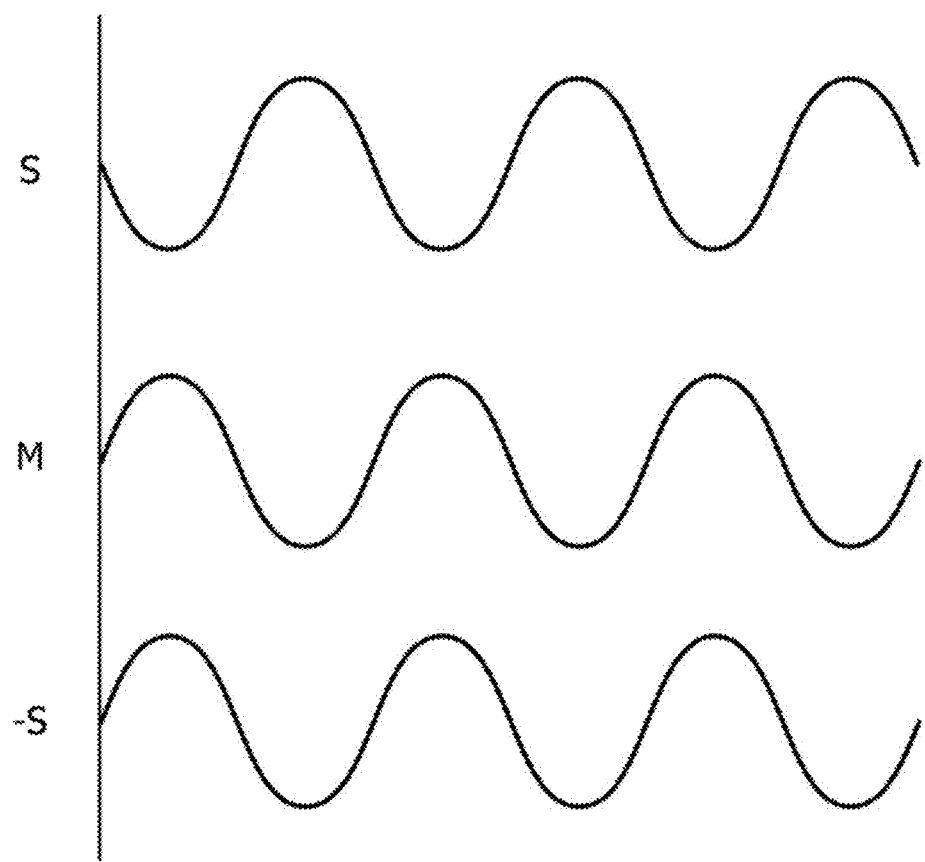
FIG. 19 is an example of a conceptual view for explaining correction of the delay of the phase of the sound signal of the M-channel microphone caused by the elevation angle and the horizontal angle from the sound source to the MS microphone.
Figure 20:
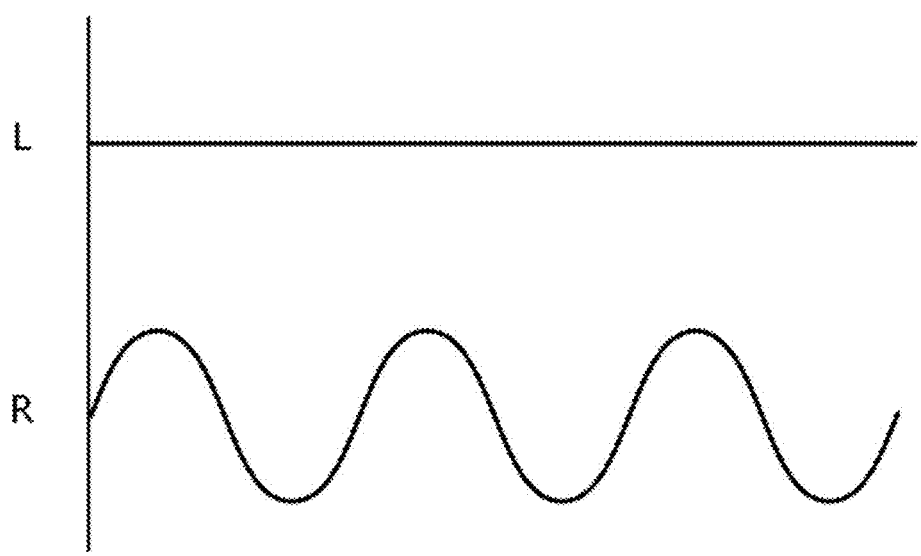
FIG. 20 is an example of a conceptual view illustrating the sound signals of the L channel and the R channel having been approximately converted by using the sound signals of the M channel and the S channel.

In FIG. 17, the waveforms of the sound signals are assumed to be sine waves. In this case, when the approximate conversion into the sound signal of the L channel and the sound signal of the R channel is performed with the sound signal of the M channel delayed by D1+D2, as exemplified in FIG. 18, the sound pressures of both the L channel and the R channel reduce. In contrast, as exemplified in FIG. 19, after the phase of the sound signal of the M channel has been corrected so as to match with the channel having a larger similarity, for example, after the phase difference from the −S channel is corrected so as to be 0, approximate conversion into the sound signal of the L channel and the sound signal of the R channel is performed. In this case, as exemplified in FIG. 20, the sound pressure of the R channel increases and the sound pressure of the L channel reduces. The reason for this is that the sound signal of the M channel and the sound signal of the −S channel are in phase, and the sound signal of the M channel and the sound signal of the S channel are in opposite phase.

When the sound signal $V_M$ of the M channel and the sound signal $V_S$ of the S channel are assumed to be sine waves only the difference between which is the phase difference, the sound signal $V_M$ of the M channel and the sound signal $V_S$ of the S channel are represented by Expressions (10). In Expressions (10), the amplitude of the sound signal $V_M$ is represented by $A_M$, the amplitude of the sound signal $V_S$ is represented by $A_S$, the angular frequency is represented by ω, time is represented by t, and the delay amount of the phase and is represented by d.

$$V_M = A_M \cos \omega t$$

$$V_S = A_S \cos \omega(t-d) \quad (10).$$

When k=1, sound signals $V_L$ and $V_R$ are calculated by Expressions (11). In Expressions (11), $\psi_1$ and $\psi_2$ are angles that satisfy Expressions (12).

$$2V_L = V_M + V_S = A_M\cos\omega t + A_S\cos\omega(t-d) \quad (11)$$
$$= A_M\cos\omega t + A_S(\cos\omega t\cos\omega d + \sin\omega t\sin\omega d)$$
$$= (A_S\sin\omega d)\sin\omega t + (A_M + A_S\cos\omega d)\cos\omega t$$
$$= \sqrt{(A_S\sin\omega d)^2 + (A_M + A_S\cos\omega d)^2} \cos(\omega t - \varphi_1)$$

$$2V_R = V_M - V_S = A_M\cos\omega t - A_S\cos\omega(t-d)$$
$$= A_M\cos\omega t - A_S(\cos\omega t\cos\omega d + \sin\omega t\sin\omega d)$$
$$= -(A_S\sin\omega d)\sin\omega t + (A_M - A_S\cos\omega d)\cos\omega t$$
$$= \sqrt{(A_S\sin\omega d)^2 + (A_M - A_S\cos\omega d)^2} \cos(\omega t - \varphi_2)$$

$$\sin\varphi_1 = \frac{A_S\sin\omega d}{\sqrt{(A_S\sin\omega d)^2 + (A_M + A_S\cos\omega d)^2}}, \quad (12)$$

$$\cos\varphi_1 = \frac{A_M + A_S\cos\omega d}{\sqrt{(A_S\sin\omega d)^2 + (A_M + A_S\cos\omega d)^2}}$$

$$\sin\varphi_2 = \frac{-A_S\sin\omega d}{\sqrt{(A_S\sin\omega d)^2 + (A_M - A_S\cos\omega d)^2}},$$

$$\cos\varphi_2 = \frac{A_M - A_S\cos\omega d}{\sqrt{(A_S\sin\omega d)^2 + (A_M - A_S\cos\omega d)^2}}$$

As represented by Expressions (11), the sound signals $V_L$ and $V_R$ have similar angular frequencies to those of the original sound signals $V_M$ and $V_S$ and the phases and amplitudes of the sound signals $V_L$ and $V_R$ are varied from those of the sound signals $V_M$ and $V_S$. The phase of the sound signal $V_S$ is corrected so as to match with the phase of the sound signal $V_M$, and $V_L$ and $V_R$ that maximize the difference in amplitude are calculated by Expressions (13) (d=0).

$$V_L = (A_M + A_S)/2 \cos(\omega t)$$

$$V_R = (A_M - A_S)/2 \cos(\omega t) \quad (13).$$

The phase of the sound signal $V_{-S}$ is corrected so as to match with the phase of the sound signal $V_M$, and $V_L$ and $V_R$ that maximize the difference in amplitude are calculated by Expressions (14) (d=π/ω).

$$V_L = (A_M - A_S)/2 \cos(\omega t)$$

$$V_R = (A_M + A_S)/2 \cos(\omega t) \quad (14).$$

Figure 21:
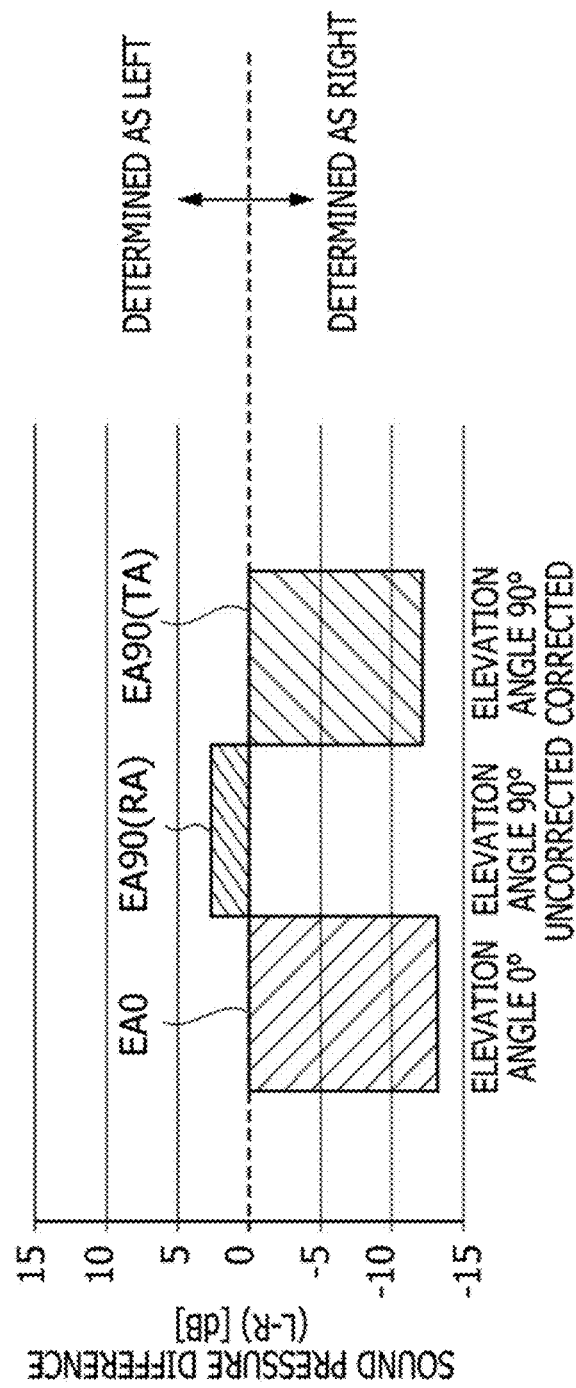
FIG. 21 is an example of a conceptual view exemplifying the relationship between the determined sound direction and the elevation angle from the sound source to the MS microphone.

As represented by the Expressions (13) and (14), when the phase difference is corrected, the sound pressure difference between the sound signal of the L channel and the sound signal of the R channel appropriately appears. As exemplified in FIG. 21, when the sound source is present at 45° in front of the MS mic on the right side, the elevation angle is 90° and the phase difference is not corrected, the fact that the sound source is present on the right side is not approximately determined (EA90 (RA)). However, when the phase difference is corrected, the fact that the sound source is present on the right side is appropriately determined (EA90 (TA)) to the same extent as the case where the elevation angle is 0° (EA0).

The similarity is not necessarily a cross-correlation coefficient. For example, the sound signal of the M channel, the sound signal of the S channel, and the sound signal of the −S channel are converted into frequency domain signals, respectively. A phase difference calculated from the frequency domain signal of the M channel and the frequency domain signal of the S channel and a phase difference calculated from the frequency domain signal of the M channel and the frequency domain signal of the −S channel may be used as the similarities.

Figure 22:
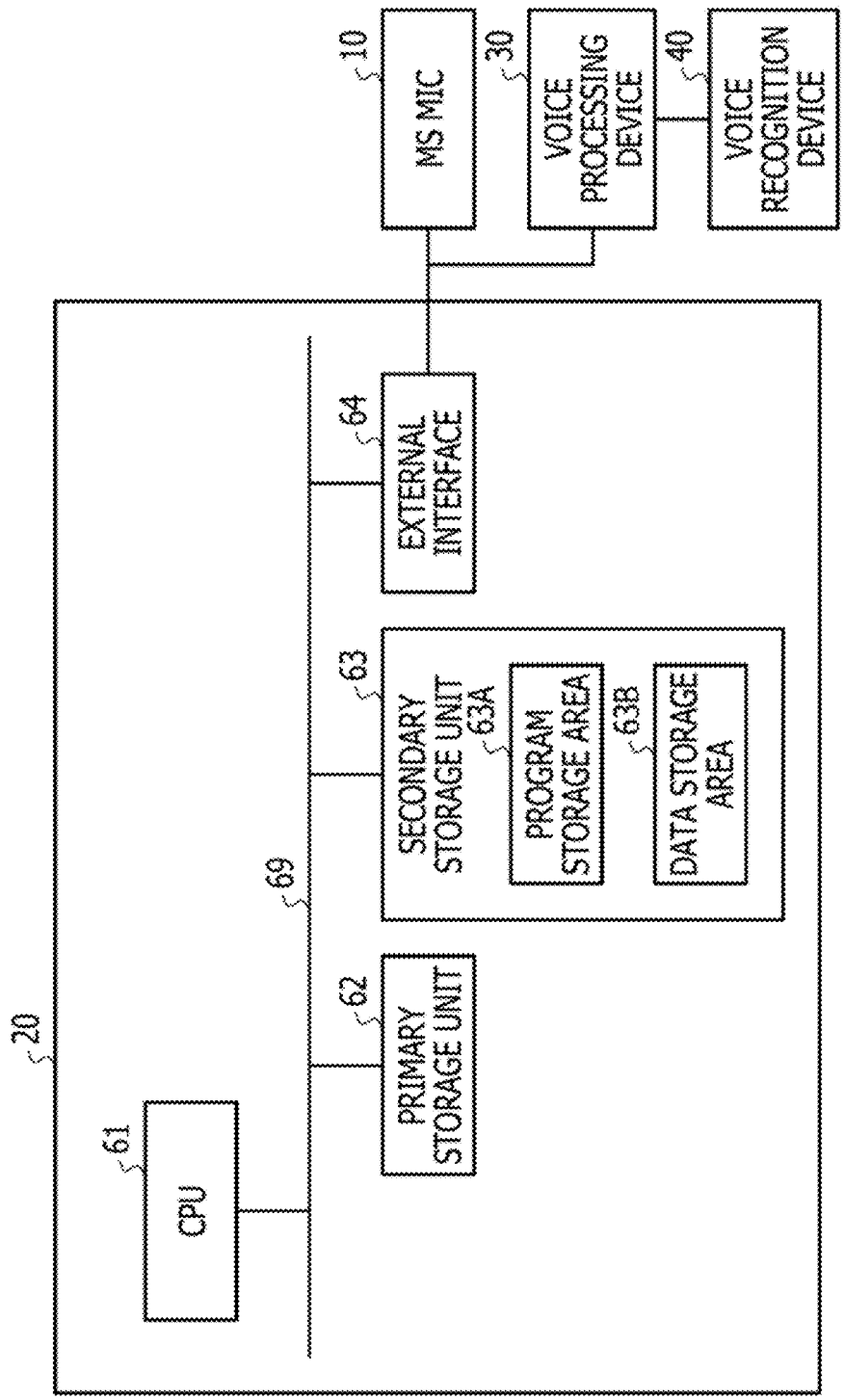
FIG. 22 is an example of a hardware configuration view of the sound signal conversion device according to the present embodiment.

As illustrated in FIG. 22, for example, the sound signal conversion device 20 includes a central processing unit (CPU) 61, a primary storage unit 62, a secondary storage unit 63, and an external interface 64. The CPU 61 is an example of a processor which is hardware. The CPU 61, the primary storage unit 62, the secondary storage unit 63, and the external interface 64 are coupled to each other via a bus 69.

The primary storage unit 62 is, for example, a volatile memory such as a random-access memory (RAM). The secondary storage unit 63 is, for example, a nonvolatile memory such as a hard disk drive (HDD) or a solid-state drive (SSD).

The secondary storage unit 63 includes a program storage area 63A and a data storage area 63B. As an example, the program storage area 63A stores programs including, for example, a sound signal conversion program. As an example, the data storage area 63B stores, for example, sound signals corresponding to the sound collected by the MS mic 10 and intermediate data generated during execution of the sound signal conversion program.

The CPU 61 reads the sound signal conversion program from the program storage area 63A and loads the sound signal conversion program onto the primary storage unit 62. The CPU 61 loads and executes the sound signal conversion program to operate as the correction unit 21 and the conversion unit 22 illustrated in FIG. 1. In more detail, the CPU 61 operates as the inversion unit 51, the phase shift unit 53, the similarity calculation unit 54, and the signal selection unit 55 illustrated in FIG. 15.

The programs including, for example, the sound signal conversion program may be stored in an external server and loaded onto the primary storage unit 62 via a network. The programs including, for example, the sound signal conversion program may be stored in a non-transitory recording medium such as a digital versatile disc (DVD) and loaded onto the primary storage unit 62 via a recording medium reading device.

External devices are coupled to the external interface 64. The external interface 64 manages transmission and reception of various types of information between the external devices and the CPU 61. FIG. 22 illustrates an example in which the MS mic 10 and the voice processing device 30 are coupled to the external interface 64, and the voice recognition device 40 is coupled to the voice processing device 30.

Alternatively, the MS mic 10, the voice processing device 30, and the voice recognition device 40 may be incorporated in the sound signal conversion device 20. One or two of MS mics 10, voice processing devices 30, and voice recognition devices 40 may be disposed in the sound signal conversion device 20.

The sound signal conversion device 20 may be, for example, a dedicated device, or may be a workstation, a personal computer, or a tablet. The MS mic 10, the sound signal conversion device 20, the voice processing device 30, and the voice recognition device 40 may be coupled wirelessly or through wires. The sound signal conversion device 20 may exist on cloud.

Figure 23:
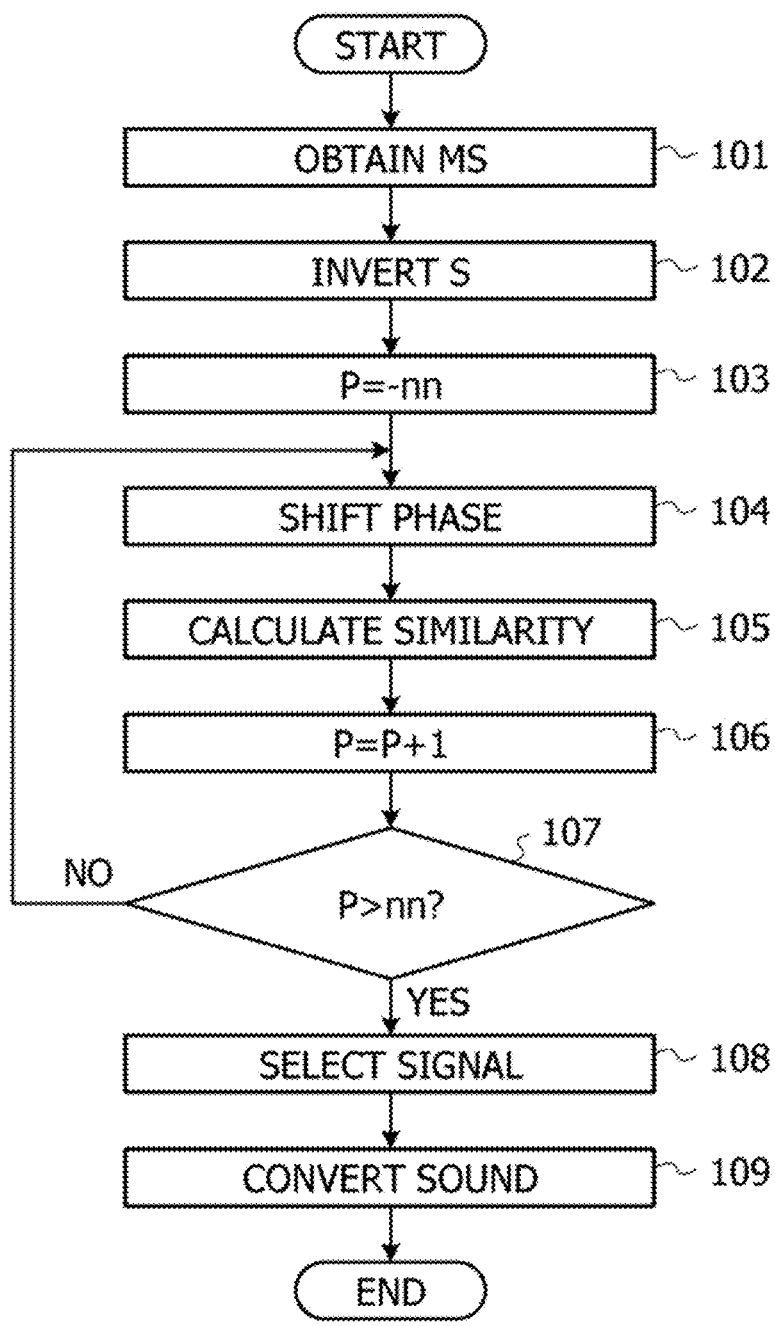
FIG. 23 is an example of a flowchart illustrating a flow of a sound signal conversion process according to the first embodiment.

Next, an outline of operation of a sound signal conversion process is described. FIG. 23 exemplifies a flow of the sound signal conversion process. The CPU 61 obtains the sound signal corresponding to the sound collected by the MS mic 10 in step 101 and inverts the sound signal corresponding to the sound obtained in the S channel to generate the sound signal of the −S channel in step 102.

In step 103, the CPU 61 sets−nn to a variable p. For example, nn may be 7. In step 104, the CPU 61 shifts the phase of the sound signal $V_M$ of the M channel by the samples corresponding to the value of the variable p. In step 105, the CPU 61 calculates the similarity between the shifted sound signal $V_M$ of the M channel and the sound signal $V_S$ of the −S channel and the similarity between the sound signal $V_M$ and the sound signal $V_{-S}$ of the −S channel.

The CPU 61 adds 1 to the variable p in step 106 and determines whether the value of the variable p exceeds nn in step 107. The value added to the variable p is the number of samples being an example of the first predetermined amount. This value to be added is not limited to 1 and may be, for example, 2. When the determination is negative in step 107, the CPU 61 returns to step 104.

When the determination is affirmative in step 107, the CPU 61 selects, in step 108, a channel that is the S channel or the −S channel corresponding to the maximum similarity among the calculated similarities as the sound signal to be used for sound conversion. Furthermore, the CPU 61 selects the sound signal $V_M$ obtained by shifting the phase by the samples corresponding to the maximum similarity as the sound signal to be used for the sound conversion. In step 109, the CPU 61 performs approximate conversion into the sound signals of the L channel and the R channel by using the selected sound signals.

According to the present embodiment, a first shift signal and a second shift signal are generated. The first shift signal reduces the phase difference caused by the difference in sound arrival distance to the M channel and the positive channel of the MS mic. The second shift signal reduces the phase difference caused by the difference in sound arrival distance to the M channel and the negative channel. The first shift signal and the second shift signal are generated based on the phase of the sound signal of the M channel or the phases of the sound signal of the positive channel of the S channel and the sound signal of the negative channel of the S channel of the MS mic.

When each of the first shift signal and the second shift signal is generated based on the phase of the sound signal of the positive channel and the phase of the sound signal of the negative channel, the sound signal of a channel having a larger similarity out of a similarity to the first shift signal and a similarity to the second shift signal is selected as a first selection signal. In addition, when the first shift signal and the second shift signal are generated based on the phase of the M channel, one of the first shift signal and the second shift signal having a larger similarity to the sound signal of the M channel is selected as a second selection signal.

When each of the first and second shift signals is generated based on the phases of the sound signals of the positive channel and the negative channel and the first selection signal is the sound signal of the positive channel, the first shift signal and the first selection signal are approximately converted into the sound signals of the L channel and the R channel of the XY microphone. The XY microphone is hereinafter referred to as an "XY mic". When the first selection signal is a sound signal of the negative channel, the second shift signal and the first selection signal are approximately converted into the sound signals of the L channel and the R channel of the XY mic. When the first shift signal and the second shift signal are generated based on the phase of the sound signal of M channel, the sound signal of the M channel and the second selection signal are approximately converted into an L channel signal and an R channel signal of the XY mic.

According to the present embodiment, the similarity between the sound signal of the M channel and the sound signal of the positive channel is calculated for each phase obtained by shifting the phase first predetermined amount-by-first predetermined amount within a predetermined range, and the sound signal of the positive channel is shifted by the phase amount of the phase that maximizes the similarity to generate the first shift signal. Or, the similarity between the sound signal of the M channel and the sound signal of the negative channel is calculated for each phase obtained by shifting the phase first predetermined amount-by-first predetermined amount within the predetermined range, and the sound signal of the negative channel is shifted by the phase amount that maximizes the similarity to generate the second shift signal. The similarity between the sound signal of the positive channel and the sound signal of the M channel is calculated for each phase obtained by shifting the phase first predetermined amount-by-first predetermined amount within the predetermined range. The sound signal of the M channel is shifted by the phase amount that maximizes the similarity to generate the first shift signal. The similarity between the sound signal of the negative channel and the sound signal of the M channel is calculated for each phase obtained by shifting the phase first predetermined amount-by-first predetermined amount within the predetermined range, and the sound signal of the M channel is shifted by the phase amount that maximizes the similarity to generate the second shift signal.

According to the present embodiment, even when the elevation angle of the sound source relative to the MS microphone is large, accuracy of determining the sound source direction of the sound collected by the MS microphone may be improved.

According to the present embodiment, accuracy of determining the sound source direction of the sound obtained by the MS microphone may be improved.

Second Embodiment

An example of a second embodiment will be described in detail below with reference to the drawings. Description of configurations and operations similar to those of the first embodiment is omitted.

According to the second embodiment, first, the phase of the sound signal $V_M$ of the M channel is slightly shifted to calculate the similarities with the sound signal $V_S$ of the positive channel and the sound signal $V_{-S}$ of the negative channel of the S channel. Thus, an appropriate shift direction of the sound signal $V_M$ is determined based on the similarity, and the phase of the sound signal $V_M$ is shifted in the appropriate direction, thereby reducing the amount of calculation.

Figure 24:
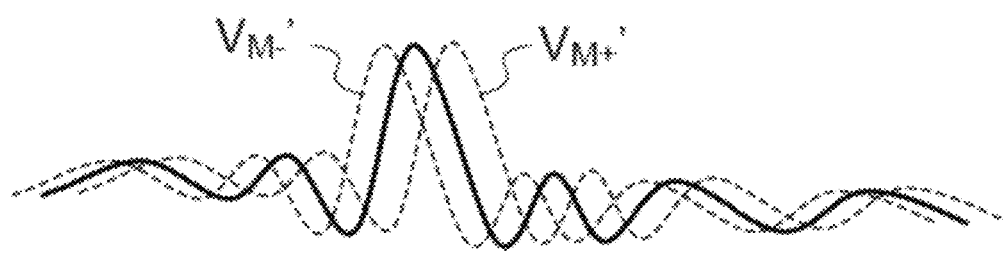
FIG. 24 is an example of a conceptual view for explaining correction of the phase of the sound signal of the M-channel microphone.

As exemplified in FIG. 24, according to the second embodiment, first, signals $V_{M+'}$, $V_{M-'}$ are generated by shifting the phase of the sound signal $V_M$ by a slight amount dd by using, for example, Expressions (15). The slight amount dd is an example of a second predetermined amount and may be, for example, 1 sample.

$$V_{M+'}(t)=V_M(t-dd)$$

$$V_{M-'}(t)=V_M(t+dd) \quad (15).$$

Figure 25:
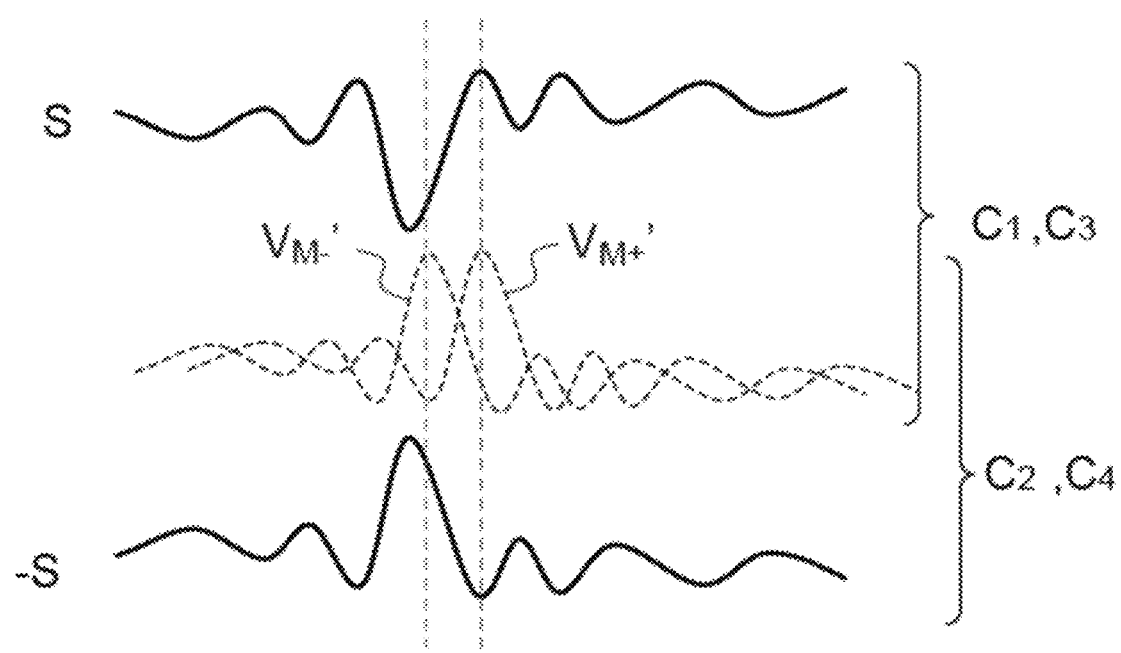
FIG. 25 is an example of a conceptual view for explaining correction of the phase of the sound signal of the M-channel microphone.

As exemplified in FIG. 25, a similarity C1(t) between $V_{M+'}$ being a slight shift signal of $V_M$ and the sound signal $V_S$ of the S channel and a similarity C2(t) between $V_{M+'}$ and the sound signal $V_{-S}$ of the −S channel are calculated. In addition, a similarity C3(t) between $V_{M-'}$ being the slight shift signal of $V_M$ and the sound signal $V_S$ and a similarity C4(t) between $V_{M-'}$ and the sound signal $V_{-S}$ are calculated. The similarities may be the above-described cross-correlation coefficient.

The shift direction of the sound signal $V_M$ corresponding to the maximum similarity among C1(t) to C4(t) is determined, and whether the maximum similarity corresponds to the S channel or the −S channel is determined. When the similarity C1(t) or C2(t) is the maximum, the phase is shifted in the advancing direction. When the similarity C3(t) or C4(t) is the maximum, the phase is shifted in the delay direction. When the similarity C1(t) or C3(t) is the maximum, the S channel is selected. When the similarity C2(t) or C4(t) is the maximum, the −S channel is selected.

Figure 26:
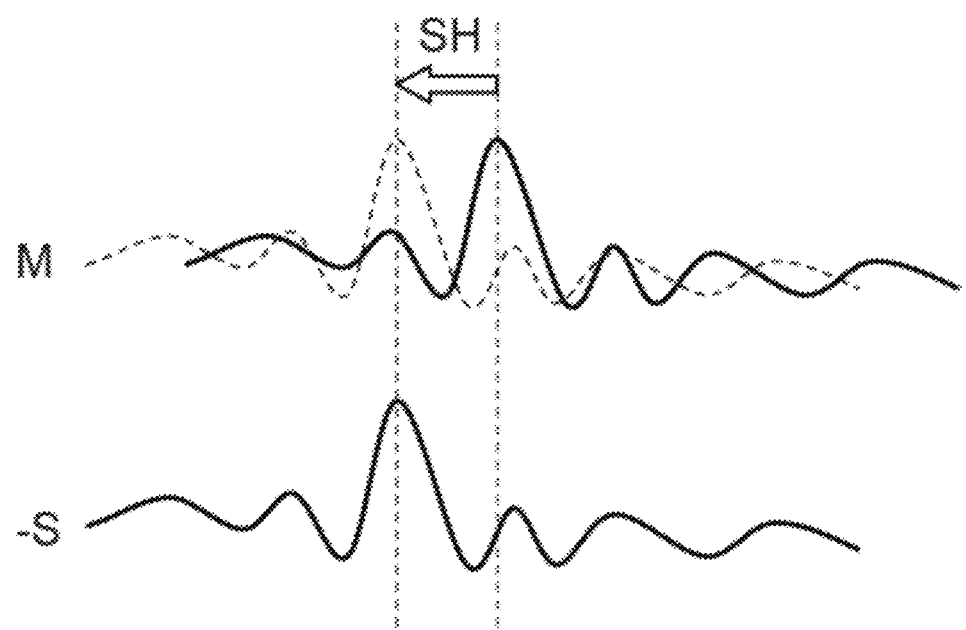
FIG. 26 is an example of a conceptual view for explaining correction of the phase of the sound signal of the M-channel microphone.
Figure 27:
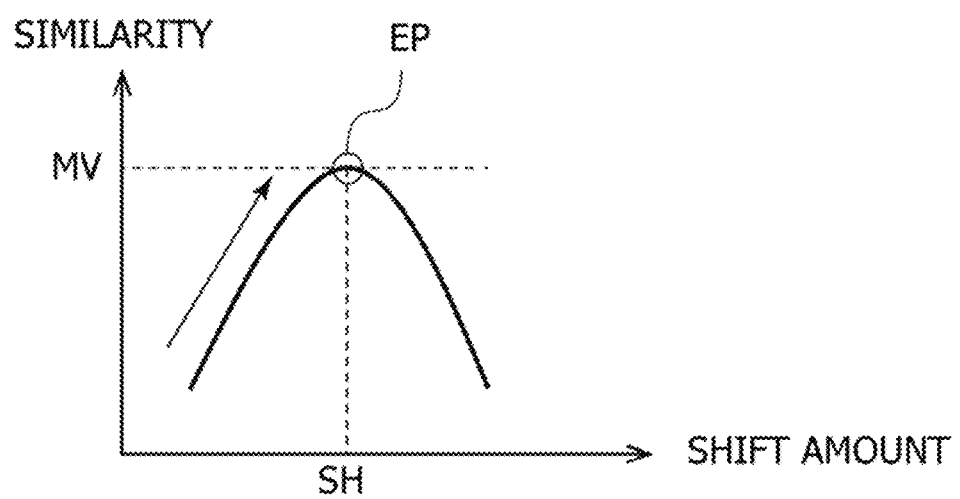
FIG. 27 is an example of a conceptual view for explaining correction of the phase of the sound signal of the M-channel microphone.

As exemplified in FIG. 26, the phase of the sound signal $V_M$ is shifted by a predetermined number of samples in the selected direction that is the delay direction here. The predetermined number of samples may be 1. As exemplified in FIG. 27, the number of samples shifted when the similarity between the shift signal and the sound signal of the −S channel takes a relative maximum point EP of a value MV is set as a correction shift amount SH, and a shift signal is generated by shifting the phase of the sound signal $V_M$ by the correction shift amount SH. In the example illustrated in FIG. 25, since C4 being the similarity between the shift signal $V_{M-'}$ and the sound signal of the −S channel is the largest, the phase of the sound signal $V_M$ is gradually shifted in the direction of delaying the phase. The generated shift signal and the sound signal of the −S channel are used for conversion into the sound signals of the L channel and the R channel.

Figure 28:
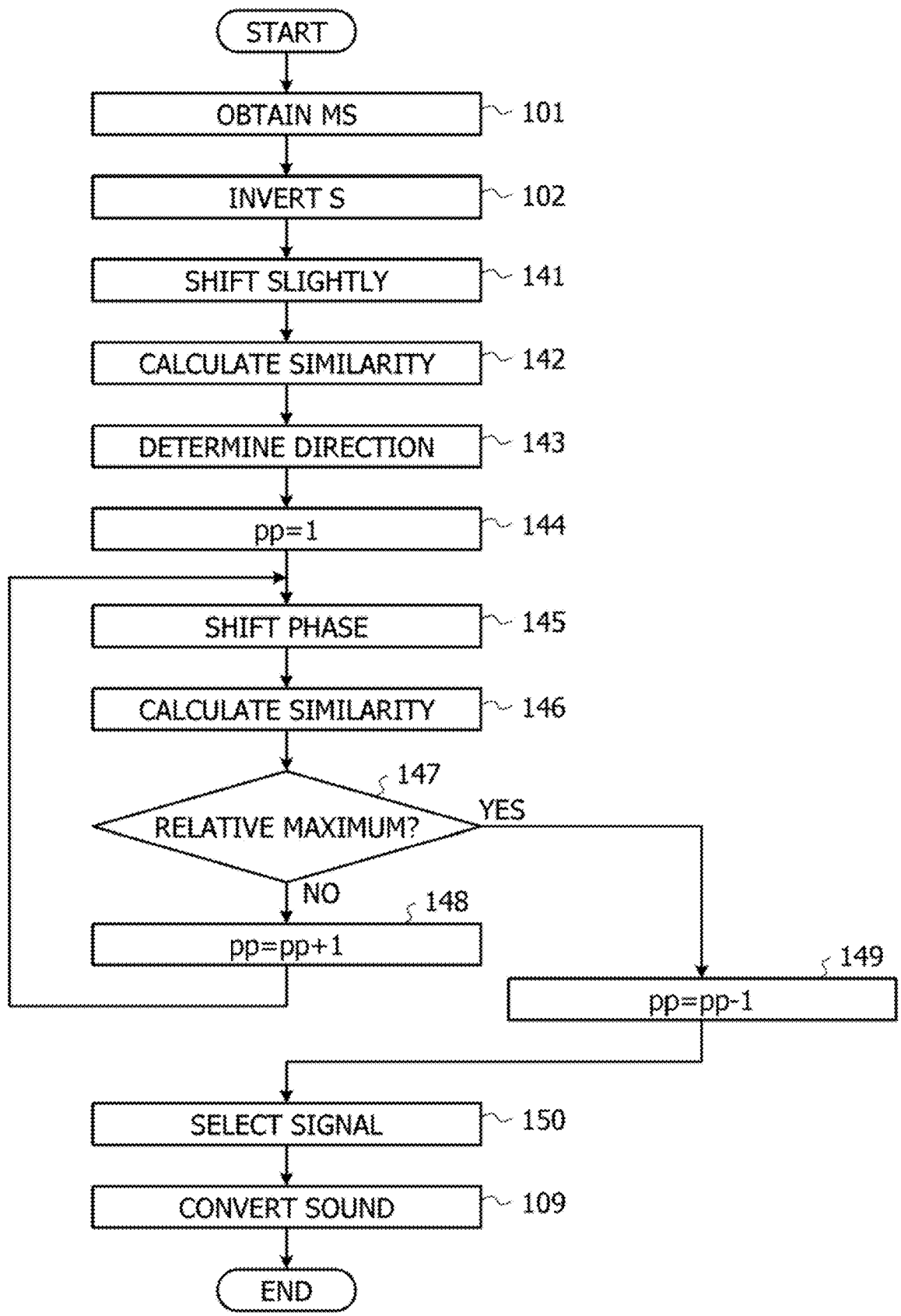
FIG. 28 is an example of a flowchart illustrating a flow of the sound signal conversion process according to a second embodiment.

Next, an outline of operation of the sound signal conversion process is described. FIG. 28 exemplifies a flow of the sound signal conversion process. Since steps 101 and 102 are similar to steps 101 and 102 illustrated in FIG. 23, the description thereof is omitted.

The CPU 61 shifts the phase of the sound signal $V_M$ of the M channel by a slight amount in the phase advancing direction and the phase delaying direction in step 141 and calculates the similarities C1 to C4 between the shifted sound signals $V_{M+'}$ and $V_{M-'}$ and the sound signals of the S channel and the −S channel in step 142. In step 143, the CPU 61 determines the shift direction for shifting the phase of the sound signal $V_M$ so as to correspond to the maximum similarity among the similarities C1 to C4 and determines whether to use the sound signal of the S channel or the sound signal of the −S channel.

In step 144, the CPU 61 sets 1 to a variable pp. In step 145, the CPU 61 shifts the phase of the sound signal $V_M$ of the M channel in the shift direction by the samples being the value of the variable pp. In step 146, the CPU 61 calculates the similarity between the shifted sound signal $V_{MH}$ of the M channel and the sound signal $V_S$ of the S channel or the similarity between the sound signal of the shifted M channel $V_{MH}$ and the sound signal $V_{-S}$ of the S channel. Which similarity is to be calculated is determined in accordance with the determination in step 143.

According to the present embodiment, when it is determined that the similarity is the relative maximum in step 147, for example, when the similarity has reduced from that indicated by an immediately previous phase shift, the process proceeds to step 149 in which 1 is subtracted from the variable pp, and the process proceeds to step 150. The reason for this is that the immediately previous correction shift amount is a correction shift amount by which the similarity indicates the relative maximum. In step 150, The CPU 61 selects a channel out of the S channel and the −S channel determined in step 143 as the selection signal to be used for sound conversion. The CPU 61 selects, as the selection signal to be used for the sound conversion, the sound signal $V_{MH}$ obtained by shifting the phase by the samples corresponding to the value of the variable pp in the direction determined in step 143.

When the determination is negative in step 147, the CPU 61 returns to step 145. Since step 109 is similar to step 109 illustrated in FIG. 23, description thereof is omitted. According to the present embodiment, the process proceeds to step 149 when the relative maximum of the similarity is detected. In the case where the relative maximum is not able to be detected even when the value of the variable pp exceeds a predetermined value, the process may be stopped due to the occurrence of an error. Alternatively, when the value of the variable pp exceeds the predetermined value, the maximum of the similarities may be set as the relative maximum.

According to the present embodiment, the similarity between the sound signal of the M channel and the sound signal of the positive channel the phase of which is shifted by the second predetermined amount in the advancing direction and the similarity between the sound signal of the M channel and the sound signal of the positive channel the phase of which is shifted by the second predetermined amount in the delay direction are calculated. The sound signal of the positive channel is shifted first predetermined amount-by-first predetermined amount in the direction in which the similarity increases. Furthermore, the similarity between the sound signal of the M channel and the sound signal of the negative channel the phase of which is shifted by the second predetermined amount in the advancing direction and the similarity between the sound signal of the M channel and the sound signal of the negative channel the phase of which is shifted by the second predetermined amount in the delay direction are calculated. The sound signal of the negative channel is shifted first predetermined amount-by-first predetermined amount in the direction in which the similarity increases. Alternatively, the similarity between the sound signal of the positive channel and the sound signal of the M channel the phase of which is shifted by the second predetermined amount in the advancing direction and the similarity between the sound signal of the positive channel and the sound signal of the M channel the phase of which is shifted by the second predetermined amount in the delay direction are calculated. The sound signal of the M channel is shifted first predetermined amount-by-first predetermined amount in the direction in which the similarity increases. Furthermore, the similarity between the sound signal of the negative channel and the sound signal of the M channel the phase of which is shifted by the second predetermined amount in the advancing direction and the similarity between the sound signal of the negative channel and the sound signal of the M channel the phase of which is shifted by the second predetermined amount in the delay direction are calculated. The sound signal of the M channel is shifted first predetermined amount-by-first predetermined amount in the direction in which the similarity increases.

According to the second embodiment, the number of calculations and the processing load may be reduced by determining the phase shift direction.

Third Embodiment

An example of a third embodiment will be described in detail below with reference to the drawings. Description of configurations and operations similar to those of the first and second embodiments is omitted.

According to the third embodiment, the elevation angle of the sound source relative to the MS mic is estimated from the correction shift amount of the phase of the sound signal, and the phase of the sound signal is corrected only when the elevation angle is within a predetermined angle.

Figure 29:
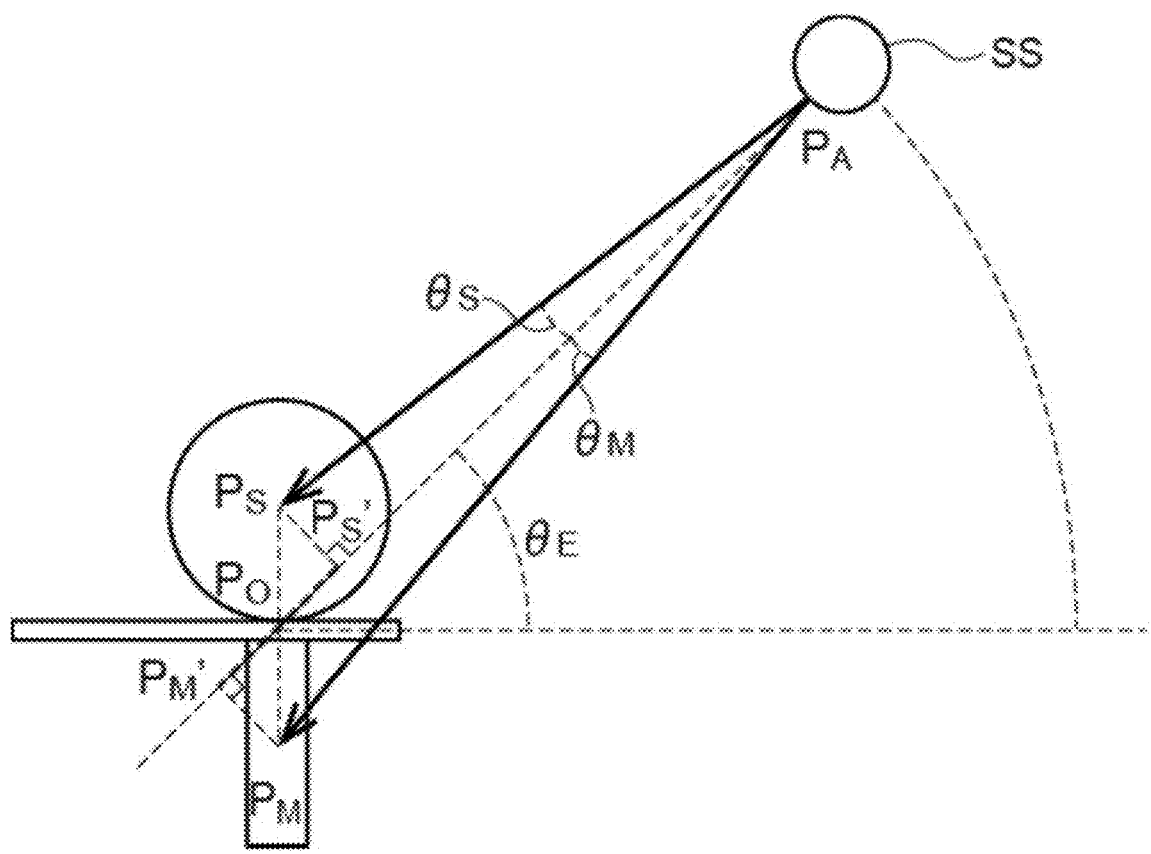
FIG. 29 is an example of a conceptual view for explaining the relationship between the elevation angle and the phase difference between the sound signal of the M-channel microphone and the sound signal of the S-channel microphone.

As exemplified in FIG. 29, the position of the M-channel mic is defined as $P_M$, the position of the S-channel mic is defined as $P_S$, the position of the sound source is defined as $P_A$, and the center position of the MS mic is defined as $P_O$. An intersection of a line segment $P_A P_O$ with a perpendicular line segment extending from $P_S$ to the line segment $P_A P_O$ is defined as $P_{S'}$, and an intersection of an extension of the line segment $P_A P_O$ with a perpendicular line segment extending from $P_M$ to the extension of the line segment $P_A P_O$ is defined as $P_{M'}$.

An elevation angle θE is calculated by, for example, Expression (16).

$$\theta_E = \arcsin[p_D \times vs/\{FS \times (\Delta s + \Delta m)\}] \quad (16).$$

Here, $p_D$ is a correction shift amount being the number of samples of the phase that has been shifted so as to match with the phases of the sound signals $V_M$ and $V_S$ or the sound signals $V_M$ and $V_{-S}$, FS is a sampling frequency [Hz], $\Delta s$ is a distance $|P_S P_O|$ measured in advance, $\Delta m$ is a distance $|P_M P_O|$ measured in advance, and vs is the speed of sound [m/sec].

Usually, a distance $|P_A P_O|$ between the MS mic and the sound source SS is larger than a distance $|P_S P_M|$ between the M-channel mic and the S-channel mic, and accordingly, $\theta_S$ and $\theta_M$ are slight values. Since $\theta_S$ and $\theta_M$ are slight values, $\cos\theta_S \approx 1$ and $\cos\theta_M \approx 1$, and approximation indicated by Expressions (17) is possible.

$$|P_A P_{S'}| = |P_A P_S|\cos\theta_S \approx |P_A P_S|$$

$$|P_A P_{M'}| = |P_A P_M|\cos\theta_M \approx |P_A P_M| \quad (17).$$

The difference between the distance between the M-channel mic and the sound source SS and the distance between the S-channel mic and the sound source SS is calculated by Expression (18).

$$|P_A P_M| \sim |P_A P_S| \approx |P_A P_{M'}| \sim |P_A P_{S'}| = |P_{M'} P_O| + |P_{S'} P_O| \quad (18).$$
$$= \Delta m \sin\theta_E + \Delta s \sin\theta_E$$
$$= (\Delta m + \Delta s)\sin\theta_E$$

The relationship between a correction shift amount $p_o$ and the difference between the distance between the M-channel mic and the sound source SS and the distance between the S-channel mic and the sound source SS is represented by Expression (19).

$$p_D = (|P_A P_M| \sim |P_A P_S|) \times FS/vs \quad (19).$$
$$= (\Delta m + \Delta s)\sin\theta_E \times FS/vs$$

According to the present embodiment, when the M-channel mic and the S-channel mic are vertically arranged, it is determined whether the elevation angle is within a predetermined range. When the elevation angle is within the predetermined range, the sound signal $V_{MH}$ of the M channel the phase of which is corrected by shifting so as to match with the phase of the sound signal of the S channel or −S channel is used for sound signal conversion. For example, when the M-channel mic and the S-channel mic are vertically arranged and the elevation angle is within the predetermined range, the sound signal $V_{MH}$ and the sound signal of the positive channel or negative channel selected from the S channel are used to perform approximate conversion into the sound signals of the L channel and the R channel. In contrast, when the elevation angle is out of the predetermined range, the uncorrected original sound signal $V_M$ and $V_S$ and $V_{-S}$ are used to perform approximate conversion into the sound signals of the L channel and the R channel.

When noise other than voice is large, the correction shift amount of the sound signal of the M channel is not necessarily appropriately determined. Since a variable range of the elevation angle is able to be recognized in advance by a method of using the MS mic, when the elevation angle is out of the variable range, it is determined that the correction shift amount is incorrect, and the uncorrected signal is used.

Figure 30:
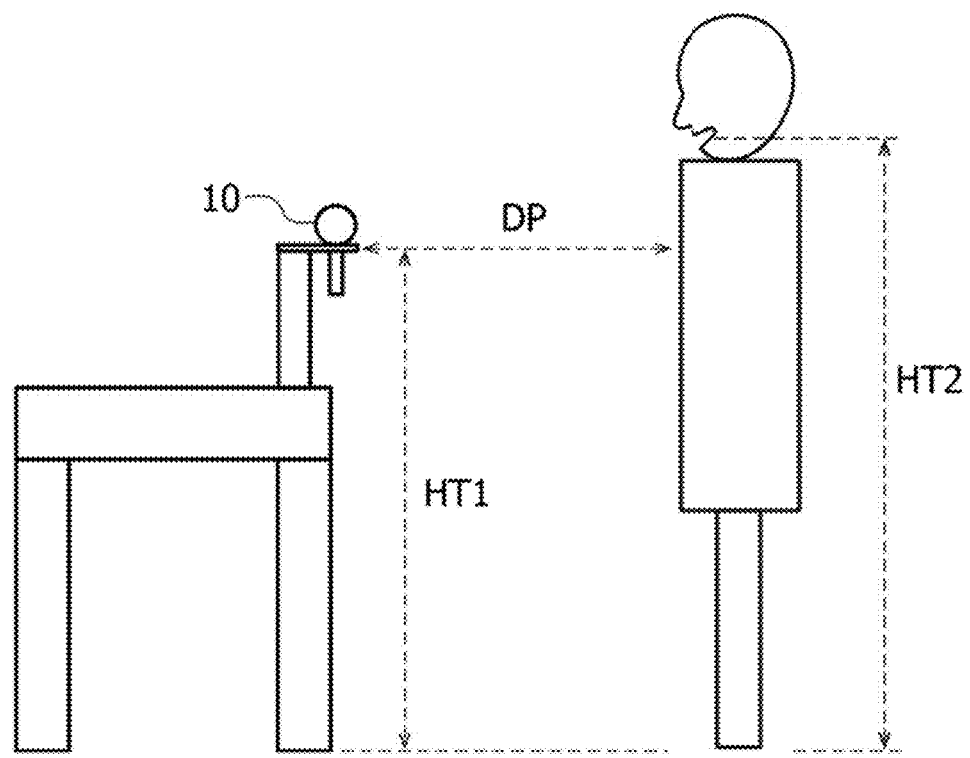
FIG. 30 is an example of a conceptual view for explaining the relationship between the elevation angle and the phase difference between the sound signal of the M-channel microphone and the sound signal of the S-channel microphone.

For example, in the case of hands-free speech translation exemplified in FIG. 30, a height HT1 of the MS mic 10 is 100 cm, a distance DP from the MS mic 10 to the speaker is 30 to 100 cm, and a height HT2 to the mouth of the speaker is 100 to 200 cm. In this case, the variable range of the elevation angle is 0 to 73°. The elevation angle is 0° when the height HT2 to the mouth of the speaker is 100 cm. The elevation angle is 73° when the distance DP from the MS mic 10 to the speaker is 30 cm and the height HT2 to the mouth of the speaker is 200 cm.

In the example illustrated in FIG. 30, when the elevation angle is within a range from 0 to 73°, the sound signal $V_{MH}$ and the sound signal of the positive channel or negative channel selected from the S channel are used to perform approximate conversion into the sound signals of the L channel and the R channel. In contrast, when the elevation angle is out of the range from 0 to 73°, the uncorrected sound signal $V_M$ of the M channel and the sound signals $V_S$ and $V_{-S}$ of the S channel are used to perform conversion into the sound signals of the L channel and the R channel.

Figure 31:
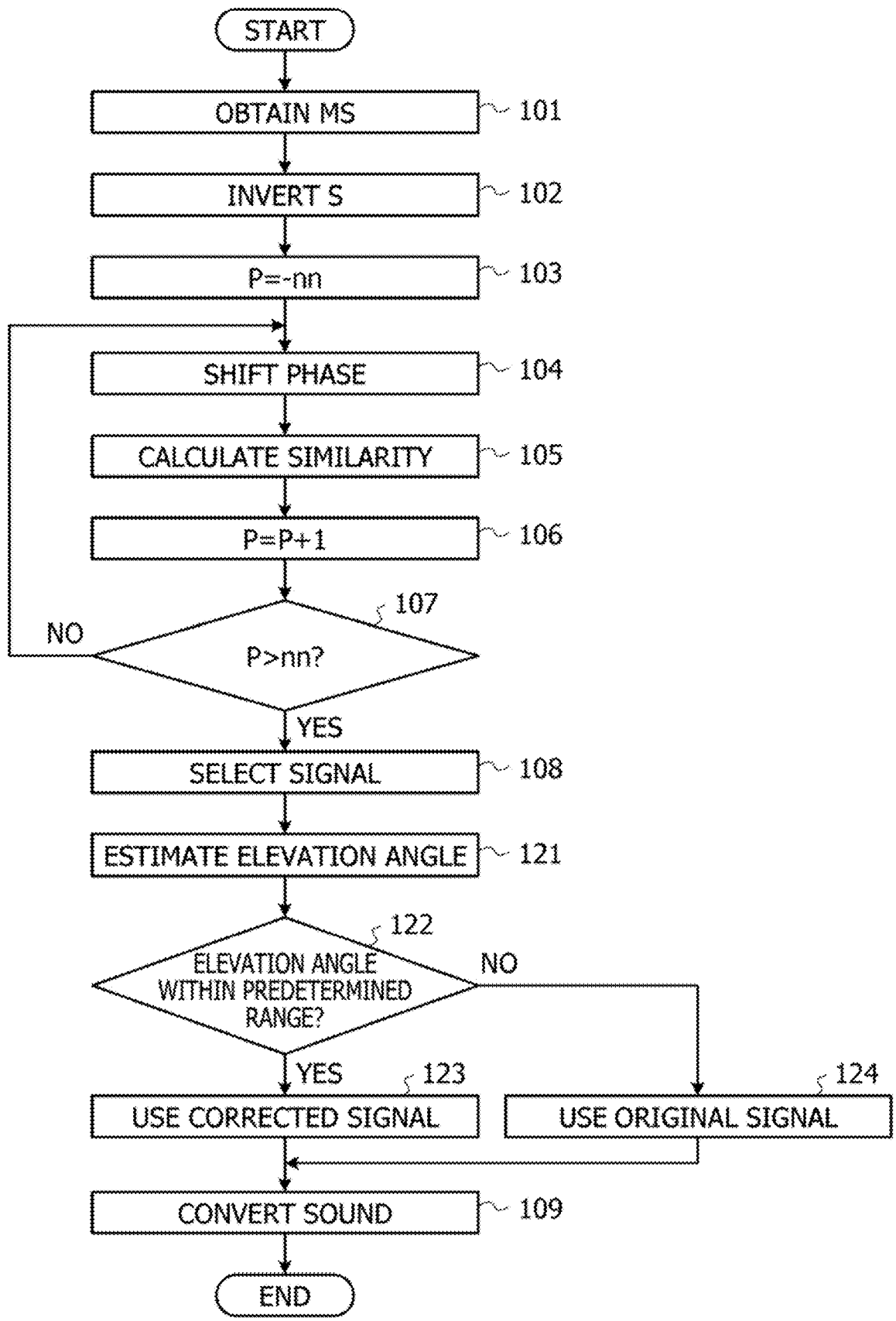
FIG. 31 is an example of a flowchart illustrating a flow of the sound signal conversion process according to a third embodiment.

Next, an outline of operation of the sound signal conversion process is described. FIG. 31 exemplifies a flow of the sound signal conversion process. Since steps 101 to 109 are similar to steps 101 to 109 illustrated in FIG. 23, the description thereof is omitted. In step 121, the CPU 61 estimates the elevation angle by using the correction shift amount.

In step 122, the CPU 61 determines whether the estimated elevation angle is within a predetermined range. When the determination in step 122 is affirmative, for example, the elevation angle is within the predetermined range, the correction shift amount is determined to be appropriate, and the phase-corrected sound signal is used for approximate conversion into the sound signals of the L channel and the R channel. When the determination in step 122 is negative, for example, the elevation angle is out of the predetermined range, the correction shift amount is determined to be not appropriate, and the uncorrected original sound signal is used for approximate conversion into the sound signals of the L channel and the R channel.

According to the third embodiment, when the estimated elevation angle is out of the predetermined range, it is determined that the determination of the correction shift amount of the phase of the sound signal is not appropriately performed. Accordingly, the phase of the sound signal is not corrected. This may suppress determination of an inappropriate sound source direction due to a sound signal the phase of which has been mistakenly corrected.

According to the first to third embodiments, the examples have been described in which the phase of the sound signal of the M channel is shifted relative to the phases of the sound signals of the S channel and the −S channel. However, the phases of the sound signals of the S channel and the −S channel may be shifted relative to the phase of the sound signal of the M channel.

Although the example has been described in which the present embodiment is applied to the first embodiment, the present embodiment may be applied to the second embodiment. The flowcharts illustrated in FIGS. 23, 28, and 31 are exemplary, and the order of the types of processing may be changed as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing a sound signal conversion program which causes a processor to perform processing, the processing comprising:

generating a first shift signal and a second shift signal by using at least any one of a phase of a sound signal of an M-channel and a phase of a sound signal of a S-channel, the sound signal of the M-channel and the sound signal of the S-channel being obtained by using a mid-side microphone, the sound signal of the S-channel including a sound signal of a positive channel and a sound signal of a negative channel, the first shift signal being a signal configured to reduce a phase difference caused by a difference between a sound arrival distance to the M-channel of the mid-side microphone and a sound arrival distance to the positive channel of the S-channel of the mid-side microphone, the second shift signal being a signal configured to reduce a phase difference caused by a difference between the sound arrival distance to the M-channel and a sound arrival distance to the negative channel of the S-channel; and approximately converting at least any one of the first shift signal and the second shift signal into an L-channel signal and an R-channel signal of an XY-microphone, wherein the generating of the first shift signal and the second shift signal is configured to:

perform first processing when the first shift signal is generated by using the phase of the sound signal of the positive channel of the S-channel and the second shift signal is generated by using the phase of the sound signal of the negative channel of the S-channel; and perform second processing when each of the first shift signal and the second shift signal is generated by using the phase of the M channel, wherein the first processing is configured to:

select a first selection signal from among the sound signal of the positive channel and the sound signal of the negative channel, such that the sound signal of the positive channel is selected as the first selection signal when a similarity between the first shift signal and the sound signal of the positive channel is larger than a similarity between the second shift signal and the sound signal of the negative channel, and the sound signal of the negative channel is selected as the first selection signal when a similarity between the second shift signal and the sound signal of the negative channel is larger than a similarity between the first shift signal and the sound signal of the positive channel;

when the selected first selection signal is the sound signal of the positive channel, approximately convert the first shift signal and the first selection signal into a sound signal of the L-channel and a sound signal of the R-channel of the XY microphone; and when the selected first selection signal is the sound signal of the negative channel, approximately convert the second shift signal and the first selection signal into the sound signal of the L-channel and the sound signal of the R-channel of the XY microphone, and wherein the second processing is configured to:

select a second selection signal from among the first shift signal and the second shift signal, such that the first shift signal is selected as the second selection signal when a similarity between the first shift signal and the sound signal of the M-channel is larger than a similarity between the second shift signal and the sound signal of the M-channel, and the second shift signal is selected as the second selection signal when the similarity between the second shift signal and the sound signal of the M-channel is larger than the similarity between the first shift signal and the sound signal of the M-channel; and approximately convert the sound signal of the M-channel and the second selection signal into the L-channel signal and the R-channel signal of an XY microphone.

2. The non-transitory computer-readable storage medium according to claim 1, wherein the generating of the first shift signal and the second shift signal is configured to execute third processing including:

calculating, for the phase every time the phase is shifted by a first predetermined amount within a predetermined range, a similarity between the sound signal of the M-channel and the sound signal of the positive channel;

shifting the sound signal of the positive channel by a phase amount of the phase that maximizes the similarity, to generate the first shift signal;

calculating, for the phase every time the phase is shifted by the first predetermined amount within the predetermined range, a similarity between the sound signal of the M-channel and the sound signal of the negative channel; and shifting the sound signal of the negative channel by a phase amount that maximizes the similarity, to generate the second shift signal, or wherein the generating of the first shift signal and the second shift signal is configured to execute fourth processing including:

calculating, for the phase every time the phase is shifted by the first predetermined amount within the predetermined range, a similarity between the sound signal of the positive channel and the sound signal of the M-channel;

shifting the sound signal of the M-channel by a phase amount that maximizes the similarity, to generate the first shift signal;

calculating, for the phase every time the phase is shifted by the first predetermined amount within the predetermined range, a similarity between the sound signal of the negative channel and the sound signal of the M-channel; and shifting the sound signal of the M-channel by a phase amount that maximizes the similarity, to generate the second shift signal.

3. The non-transitory computer-readable storage medium according to claim 2, wherein the third processing is configured to:

calculate a similarity between the sound signal of the M-channel and the sound signal of the positive channel the phase of which is shifted by a second predetermined amount in an advancing direction;

calculate a similarity between the sound signal of the M-channel and the sound signal of the positive channel the phase of which is shifted by the second predetermined amount in a delay direction;

shift the sound signal of the positive channel by the first predetermined amount in a direction in which the similarity increases;

calculate a similarity between the sound signal of the M-channel and the sound signal of the negative channel the phase of which is shifted by the second predetermined amount in the advancing direction;

calculate a similarity between the sound signal of the M-channel and the sound signal of the negative channel the phase of which is shifted by the second predetermined amount in the delay direction; and shift the sound signal of the negative channel by the first predetermined amount in the direction in which the similarity increases, or wherein the fourth processing is configured to:

calculate a similarity between the sound signal of the positive channel and the sound signal of the M-channel the phase of which is shifted by the second predetermined amount in the advancing direction;

calculate a similarity between the sound signal of the positive channel and the sound signal of the M-channel the phase of which is shifted by the second predetermined amount in the delay direction;

shift the sound signal of the M-channel by the first predetermined amount in the direction in which the similarity increases;

calculate a similarity between the sound signal of the negative channel and the sound signal of the M-channel the phase of which is shifted by the second predetermined amount in the advancing direction;

calculate a similarity between the sound signal of the negative channel and the sound signal of the M-channel the phase of which is shifted by the second predetermined amount in the delay direction; and shift the sound signal of the M-channel by the first predetermined amount in the direction in which the similarity increases.

4. The non-transitory computer-readable storage medium according to claim 1, wherein
each similarity is a cross-correlation coefficient.

5. The non-transitory computer-readable storage medium according to claim 1, wherein
the approximate conversion is performed when an elevation angle of a sound source to the mid-side microphone estimated from a shift amount of the phase in generation of the first shift signal and the second shift signal is within a predetermined range.

6. A method of converting a sound signal, the method being implemented by a computer, the method comprising:
generating a first shift signal and a second shift signal by using at least any one of a phase of a sound signal of an M-channel and a phase of a sound signal of a S-channel, the sound signal of the M-channel and the sound signal of the S-channel being obtained by using a mid-side microphone, the sound signal of the S-channel including a sound signal of a positive channel and a sound signal of a negative channel, the first shift signal being a signal configured to reduce a phase difference caused by a difference between a sound arrival distance to the M-channel of the mid-side microphone and a sound arrival distance to the positive channel of the S-channel of the mid-side microphone, the second shift signal being a signal configured to reduce a phase difference caused by a difference between the sound arrival distance to the M-channel and a sound arrival distance to the negative channel of the S-channel; and
approximately converting at least any one of the first shift signal and the second shift signal into an L-channel signal and an R-channel signal of an XY-microphone,
wherein the generating of the first shift signal and the second shift signal is configured to:
perform first processing when the first shift signal is generated by using the phase of the sound signal of the positive channel of the S-channel and the second shift signal is generated by using the phase of the sound signal of the negative channel of the S-channel; and
perform second processing when each of the first shift signal and the second shift signal is generated by using the phase of the M channel,
wherein the first processing is configured to:
select a first selection signal from among the sound signal of the positive channel and the sound signal of the negative channel, such that the sound signal of the positive channel is selected as the first selection signal when a similarity between the first shift signal and the sound signal of the positive channel is larger than a similarity between the second shift signal and the sound signal of the negative channel, and the sound signal of the negative channel is selected as the first selection signal when a similarity between the second shift signal and the sound signal of the negative channel is larger than a similarity between the first shift signal and the sound signal of the positive channel;
when the selected first selection signal is the sound signal of the positive channel, approximately convert the first shift signal and the first selection signal into a sound signal of the L-channel and a sound signal of the R-channel of the XY microphone; and
when the selected first selection signal is the sound signal of the negative channel, approximately convert the second shift signal and the first selection signal into the sound signal of the L-channel and the sound signal of the R-channel of the XY microphone, and
wherein the second processing is configured to:
select a second selection signal from among the first shift signal and the second shift signal, such that the first shift signal is selected as the second selection signal when a similarity between the first shift signal and the sound signal of the M-channel is larger than a similarity between the second shift signal and the sound signal of the M-channel, and the second shift signal is selected as the second selection signal when the similarity between the second shift signal and the sound signal of the M-channel is larger than the similarity between the first shift signal and the sound signal of the M-channel; and
approximately convert the sound signal of the M-channel and the second selection signal into the L-channel signal and the R-channel signal of an XY microphone.

7. The method according to claim 6,
wherein the generating of the first shift signal and the second shift signal is configured to execute third processing including:
calculating, for the phase every time the phase is shifted by a first predetermined amount within a predetermined range, a similarity between the sound signal of the M-channel and the sound signal of the positive channel;
shifting the sound signal of the positive channel by a phase amount of the phase that maximizes the similarity, to generate the first shift signal;
calculating, for the phase every time the phase is shifted by the first predetermined amount within the predetermined range, a similarity between the sound signal of the M-channel and the sound signal of the negative channel; and
shifting the sound signal of the negative channel by a phase amount that maximizes the similarity, to generate the second shift signal, or
wherein the generating of the first shift signal and the second shift signal is configured to execute fourth processing including:
calculating, for the phase every time the phase is shifted by the first predetermined amount within the predetermined range, a similarity between the sound signal of the positive channel and the sound signal of the M-channel;
shifting the sound signal of the M-channel by a phase amount that maximizes the similarity, to generate the first shift signal;
calculating, for the phase every time the phase is shifted by the first predetermined amount within the predetermined range, a similarity between the sound signal of the negative channel and the sound signal of the M-channel; and
shifting the sound signal of the M-channel by a phase amount that maximizes the similarity, to generate the second shift signal.

8. The method according to claim 7,
wherein the third processing is configured to:
calculate a similarity between the sound signal of the M-channel and the sound signal of the positive channel the phase of which is shifted by a second predetermined amount in an advancing direction;
calculate a similarity between the sound signal of the M-channel and the sound signal of the positive channel the phase of which is shifted by the second predetermined amount in a delay direction;
shift the sound signal of the positive channel by the first predetermined amount in a direction in which the similarity increases;
calculate a similarity between the sound signal of the M-channel and the sound signal of the negative channel the phase of which is shifted by the second predetermined amount in the advancing direction;

calculate a similarity between the sound signal of the M-channel and the sound signal of the negative channel the phase of which is shifted by the second predetermined amount in the delay direction; and shift the sound signal of the negative channel by the first predetermined amount in the direction in which the similarity increases, or wherein the fourth processing is configured to:

calculate a similarity between the sound signal of the positive channel and the sound signal of the M-channel the phase of which is shifted by the second predetermined amount in the advancing direction;

calculate a similarity between the sound signal of the positive channel and the sound signal of the M-channel the phase of which is shifted by the second predetermined amount in the delay direction;

shift the sound signal of the M-channel by the first predetermined amount in the direction in which the similarity increases;

calculate a similarity between the sound signal of the negative channel and the sound signal of the M-channel the phase of which is shifted by the second predetermined amount in the advancing direction;

calculate a similarity between the sound signal of the negative channel and the sound signal of the M-channel the phase of which is shifted by the second predetermined amount in the delay direction; and shift the sound signal of the M-channel by the first predetermined amount in the direction in which the similarity increases.

9. The method according to claim 6, wherein
each similarity is a cross-correlation coefficient.

10. The method according to claim 6, wherein
the approximate conversion is performed when an elevation angle of a sound source to the mid-side microphone estimated from a shift amount of the phase in generation of the first shift signal and the second shift signal is within a predetermined range.

11. A sound signal conversion device comprising:
a memory configured to store program instructions; and
a processor coupled to the memory, the processor being configured to execute the program instructions, the program instructions including:
generating a first shift signal and a second shift signal by using at least any one of a phase of a sound signal of an M-channel and a phase of a sound signal of a S-channel, the sound signal of the M-channel and the sound signal of the S-channel being obtained by using a mid-side microphone, the sound signal of the S-channel including a sound signal of a positive channel and a sound signal of a negative channel, the first shift signal being a signal configured to reduce a phase difference caused by a difference between a sound arrival distance to the M-channel of the mid-side microphone and a sound arrival distance to the positive channel of the S-channel of the mid-side microphone, the second shift signal being a signal configured to reduce a phase difference caused by a difference between the sound arrival distance to the M-channel and a sound arrival distance to the negative channel of the S-channel; and approximately converting at least any one of the first shift signal and the second shift signal into an L-channel signal and an R-channel signal of an XY-microphone, wherein the generating of the first shift signal and the second shift signal is configured to:

perform first processing when the first shift signal is generated by using the phase of the sound signal of the positive channel of the S-channel and the second shift signal is generated by using the phase of the sound signal of the negative channel of the S-channel; and perform second processing when each of the first shift signal and the second shift signal is generated by using the phase of the M channel, wherein the first processing is configured to:

select a first selection signal from among the sound signal of the positive channel and the sound signal of the negative channel, such that the sound signal of the positive channel is selected as the first selection signal when a similarity between the first shift signal and the sound signal of the positive channel is larger than a similarity between the second shift signal and the sound signal of the negative channel, and the sound signal of the negative channel is selected as the first selection signal when a similarity between the second shift signal and the sound signal of the negative channel is larger than a similarity between the first shift signal and the sound signal of the positive channel;

when the selected first selection signal is the sound signal of the positive channel, approximately convert the first shift signal and the first selection signal into a sound signal of the L-channel and a sound signal of the R-channel of the XY microphone; and when the selected first selection signal is the sound signal of the negative channel, approximately convert the second shift signal and the first selection signal into the sound signal of the L-channel and the sound signal of the R-channel of the XY microphone, and wherein the second processing is configured to:

select a second selection signal from among the first shift signal and the second shift signal, such that the first shift signal is selected as the second selection signal when a similarity between the first shift signal and the sound signal of the M-channel is larger than a similarity between the second shift signal and the sound signal of the M-channel, and the second shift signal is selected as the second selection signal when the similarity between the second shift signal and the sound signal of the M-channel is larger than the similarity between the first shift signal and the sound signal of the M-channel; and approximately convert the sound signal of the M-channel and the second selection signal into the L-channel signal and the R-channel signal of an XY microphone.

12. The sound signal conversion device according to claim 11, wherein the generating of the first shift signal and the second shift signal is configured to execute third processing including:

calculating, for the phase every time the phase is shifted by a first predetermined amount within a predetermined range, a similarity between the sound signal of the M-channel and the sound signal of the positive channel;

shifting the sound signal of the positive channel by a phase amount of the phase that maximizes the similarity, to generate the first shift signal;

calculating, for the phase every time the phase is shifted by the first predetermined amount within the predetermined range, a similarity between the sound signal of the M-channel and the sound signal of the negative channel; and shifting the sound signal of the negative channel by a phase amount that maximizes the similarity, to generate the second shift signal, or wherein the generating of the first shift signal and the second shift signal is configured to execute fourth processing including:

calculating, for the phase every time the phase is shifted by the first predetermined amount within the predetermined range, a similarity between the sound signal of the positive channel and the sound signal of the M-channel;

shifting the sound signal of the M-channel by a phase amount that maximizes the similarity, to generate the first shift signal;

calculating, for the phase every time the phase is shifted by the first predetermined amount within the predetermined range, a similarity between the sound signal of the negative channel and the sound signal of the M-channel; and shifting the sound signal of the M-channel by a phase amount that maximizes the similarity, to generate the second shift signal.

13. The sound signal conversion device according to claim 12, wherein the third processing is configured to:

calculate a similarity between the sound signal of the M-channel and the sound signal of the positive channel the phase of which is shifted by a second predetermined amount in an advancing direction;

calculate a similarity between the sound signal of the M-channel and the sound signal of the positive channel the phase of which is shifted by the second predetermined amount in a delay direction;

shift the sound signal of the positive channel by the first predetermined amount in a direction in which the similarity increases;

calculate a similarity between the sound signal of the M-channel and the sound signal of the negative channel the phase of which is shifted by the second predetermined amount in the advancing direction;

calculate a similarity between the sound signal of the M-channel and the sound signal of the negative channel the phase of which is shifted by the second predetermined amount in the delay direction; and shift the sound signal of the negative channel by the first predetermined amount in the direction in which the similarity increases, or wherein the fourth processing is configured to:

calculate a similarity between the sound signal of the positive channel and the sound signal of the M-channel the phase of which is shifted by the second predetermined amount in the advancing direction;

calculate a similarity between the sound signal of the positive channel and the sound signal of the M-channel the phase of which is shifted by the second predetermined amount in the delay direction;

shift the sound signal of the M-channel by the first predetermined amount in the direction in which the similarity increases;

calculate a similarity between the sound signal of the negative channel and the sound signal of the M-channel the phase of which is shifted by the second predetermined amount in the advancing direction;

calculate a similarity between the sound signal of the negative channel and the sound signal of the M-channel the phase of which is shifted by the second predetermined amount in the delay direction; and shift the sound signal of the M-channel by the first predetermined amount in the direction in which the similarity increases.

14. The sound signal conversion device according to claim 11, wherein each similarity is a cross-correlation coefficient.

15. The sound signal conversion device according to claim 11, wherein the approximate conversion is performed when an elevation angle of a sound source to the mid-side microphone estimated from a shift amount of the phase in generation of the first shift signal and the second shift signal is within a predetermined range.

* * * * *